US012406463B2

(12) United States Patent
Ninan et al.

(10) Patent No.: US 12,406,463 B2
(45) Date of Patent: Sep. 2, 2025

(54) REPRESENTING VOLUMETRIC VIDEO IN SALIENCY VIDEO STREAMS

(71) Applicant: Dolby Laboratories Licensing Corporation, San Francisco, CA (US)

(72) Inventors: Ajit Ninan, San Jose, CA (US); Shwetha Ram, San Jose, CA (US); Gregory John Ward, San Francisco, CA (US); Domagoj Baricevic, San Francisco, CA (US); Vijay Kamarshi, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 305 days.

(21) Appl. No.: 18/009,120

(22) PCT Filed: Jun. 16, 2021

(86) PCT No.: PCT/US2021/037608
§ 371 (c)(1),
(2) Date: Dec. 8, 2022

(87) PCT Pub. No.: WO2021/257690
PCT Pub. Date: Dec. 23, 2021

(65) Prior Publication Data
US 2023/0215129 A1   Jul. 6, 2023

Related U.S. Application Data

(60) Provisional application No. 63/039,589, filed on Jun. 16, 2020.

(30) Foreign Application Priority Data

Jun. 16, 2020 (EP) .................... 20180178

(51) Int. Cl.
*G06V 10/46* (2022.01)
*G06T 7/20* (2017.01)
(Continued)

(52) U.S. Cl.
CPC .............. *G06V 10/462* (2022.01); *G06T 7/20* (2013.01); *G06T 7/40* (2013.01); *G06T 7/55* (2017.01);
(Continued)

(58) Field of Classification Search
CPC ........ G06V 10/462; G06V 10/25; G06T 7/20; G06T 7/40; G06T 7/55; H04N 13/383;
(Continued)

(56) References Cited

U.S. PATENT DOCUMENTS 7,020,668 B2 * 3/2006 Matsuda ................. G11B 20/12
8,666,146 B1 * 3/2014 Smolic ..................... G06T 3/18
348/42

(Continued)

FOREIGN PATENT DOCUMENTS

WO   2009001255 A1   12/2008
WO   2013168091 A1   11/2013
(Continued)

OTHER PUBLICATIONS

ITU-T H.264, "Advanced Video coding for Generic Audiovisual Services" Series H: Audiovisual and Multimedia systems, Infrastructure of Audiovisual services—Coding of Moving Video, Jan. 2012, 680 pages.

(Continued)

*Primary Examiner* — Kathleen Y Dulaney

(57) ABSTRACT

Saliency regions are identified in a global scene depicted by volumetric video. Saliency video streams that track the saliency regions are generated. Each saliency video stream tracks a respective saliency region. A saliency stream based (Continued)

representation of the volumetric video is generated to include the saliency video streams. The saliency stream based representation of the volumetric video is transmitted to a video streaming client.

11 Claims, 12 Drawing Sheets

(51) Int. Cl.
| | |
|---|---|
| *G06T 7/40* | (2017.01) |
| *G06T 7/55* | (2017.01) |
| *G06V 10/25* | (2022.01) |
| *H04N 13/383* | (2018.01) |
| *H04N 13/388* | (2018.01) |

(52) U.S. Cl.
CPC ............ *G06V 10/25* (2022.01); *H04N 13/383* (2018.05); *H04N 13/388* (2018.05)

(58) Field of Classification Search
CPC ......... H04N 13/388; H04N 21/234318; H04N 21/2365; H04N 21/816; H04N 21/4728
USPC ............................. 382/190, 154, 173; 348/43
See application file for complete search history.

(56) References Cited

U.S. PATENT DOCUMENTS

| | | | |
|---|---|---|---|
| 9,041,709 B2 | 5/2015 | Bruls | |
| 9,147,221 B2* | 9/2015 | Grasset | ..................... G06T 1/00 |
| 9,338,431 B2 | 5/2016 | Lee | |
| 9,467,750 B2 | 10/2016 | Banica | |
| 10,051,286 B2 | 8/2018 | Grangetto | |
| 10,074,012 B2 | 9/2018 | Zhou | |
| 10,237,548 B2 | 3/2019 | Korneliussen | |
| 10,362,265 B2* | 7/2019 | Pio | ........................ G06V 10/462 |
| 10,419,737 B2 | 9/2019 | Pang | |
| 2010/0215251 A1 | 8/2010 | Klein Gunnewiek | |
| 2013/0127844 A1 | 5/2013 | Koeppel | |
| 2013/0326583 A1 | 12/2013 | Freihold | |
| 2014/0176553 A1 | 6/2014 | Pettersson | |
| 2014/0359152 A1* | 12/2014 | Heng | ..................... H04L 65/612 709/231 |
| 2015/0350594 A1 | 12/2015 | Mate | |
| 2017/0118540 A1* | 4/2017 | Thomas | ......... H04N 21/440263 |
| 2017/0318262 A1 | 11/2017 | Safaei | |
| 2017/0332064 A1 | 11/2017 | Martineau | |
| 2018/0007352 A1 | 1/2018 | Chang | |
| 2018/0097867 A1 | 4/2018 | Pang | |
| 2018/0109817 A1 | 4/2018 | Wang | |
| 2018/0146198 A1* | 5/2018 | Atluru | ................... H04N 19/167 |
| 2018/0199042 A1 | 7/2018 | Wang | |
| 2018/0359489 A1 | 12/2018 | Lakshman | |
| 2019/0213784 A1 | 7/2019 | Schmalstieg | |
| 2019/0373278 A1* | 12/2019 | Castaneda | ............ H04N 19/172 |
| 2020/0021791 A1 | 1/2020 | Hur | |
| 2020/0045290 A1 | 2/2020 | Ruhm | |
| 2020/0279384 A1 | 9/2020 | Jia | |
| 2020/0286293 A1 | 9/2020 | Jia | |
| 2020/0288114 A1* | 9/2020 | Lakshman | ........... H04N 13/383 |
| 2023/0224447 A1* | 7/2023 | Ward | ................... H04N 13/161 348/43 |

FOREIGN PATENT DOCUMENTS

| | | | |
|---|---|---|---|
| WO | 2017080420 A1 | 5/2017 | |
| WO | 2019055389 A1 | 3/2019 | |
| WO | 2019209838 A1 | 10/2019 | |
| WO | 2019211519 A1 | 11/2019 | |
| WO | 2019243663 A1 | 12/2019 | |
| WO | 2020008106 A1 | 1/2020 | |
| WO | WO2021257639 A1 | 12/2021 | |

OTHER PUBLICATIONS

Korea Aerospace University et al, "KAU Response to Immersive Video CE3: Atlas Padding," ISO/IEC JTC1/SC29/ WG11 MPEG2020/ m52189 (Jan. 2020.), 4 pages.

Kwang-Soon Lee, Jeong-Il Seo, "Trends and Prospects of MPEG Immersive Video Standard Technology," IITP, Weekly Technology Trends, Issue 1969, Oct. 21, 2020, 44 pages.

M. Wien, J. M. Boyce, T. Stockhammer, and W.-H. Peng, "Standardization Status of Immersive Video Coding," IEEE JourEmerg. Select. Topics Circuits Syst., vol. 9, No. 1, Mar. 2019, pp. 5-17, 13 pages.

Chen et al., "Test Model 11 of 3D-HEVC and MV-HEVC," ISO/ IEC JTC1/SC29/WG11 N 15141, Feb. 2015, Geneva, Switzerland, <https://mpeg.chiariglione.org/standards/mpeg-h/hevc-reference-software/n15141-test-model-11-3d-hevc-and-mv-hevc>.

U.S. Appl. No. 62/423,287, Prediction and Verifying Regions of Interest Selections, filed Nov. 17, 2016.

U.S. Appl. No. 62/518,187, "Coding Multiview Video," filed Jun. 12, 2017.

U.S. Appl. No. 62/811,956, Hole Filling for Depth Image Based Rendering, filed Apr. 1, 2019.

U.S. Appl. No. 62/813,527, "Multi-Resolution Multi-View Video Rendering," filed Mar. 4, 2019.

U.S. Appl. No. 63/039,595, "Supporting Multi-View Video Operations with Disocclusion Atlas," filed Jun. 16, 2020.

Shum et al., "A Review of Image-Based Rendering Techniques," Microsoft Research Document, Feb. 2016, accessed May 15, 2023, <https://www.microsoft.com/en-us/research/wpcontent/uploads/2016/ 02/review_image_rendering.pdf)>.

A Review of Image-based Rendering Techniques (https://www. microsoft.com/en-us/research/wpcontent/uploads/2016/02/review_ image_rendering.pdf), pp. 1-12, 12 pages.

Garcia-Dorado et al., "Automatic urban modeling using volumetric reconstruction with surface graph cuts," Computers & Graphics. Nov. 1, 2013;37(7): pp. 896-910. (Year: 2013), 16 pages.

"HEVC-3D standard," 2013-2021 Fraunhofer Heinrich Hertz Institute, pp. 1-2, 2 pages.

"VPCC Codec Description," MPEG-I VPCC Standard, Jun. 17, 2020, ISO/IEC JTC 1/SC 29/WG 7, pp. 1-77, 77 pages.

Mueller et al., "Shading atlas streaming," ACM Transactions on Graphics (TOG), 37(6), (Year: 2018), pp. 1-16, 16 pages.

N15141, Test Model 11 of 3D-HEVC and MV-HEVC (https://mpeg. chiariglione.org/standards/mpeg-h/hevc-reference-software/n15141-test-model-11-3d-hevc-and-mv-hevc), Feb. 2015, pp. 1-58, 58 pages.

\* cited by examiner identify saliency regions in a global scene 402 generate saliency video streams that track the saliency regions 404 generate a saliency stream based representation of the volumetric video 406 transmit the saliency stream based representation of the volumetric video to a video streaming client 408

FIG. 4A receive a saliency stream based representation of the volumetric video from a video streaming server 452 derive saliency region images from saliency video streams 454 cause reconstructed images generated from the saliency region image to be rendered on an image display 456

FIG. 4B

REPRESENTING VOLUMETRIC VIDEO IN SALIENCY VIDEO STREAMS

CROSS-REFERENCE TO RELATED APPLICATIONS

This application is a U.S. National Stage application under U.S.C. 371 of International Application No. PCT/US2021/037608, filed on Jun. 16, 2021, which claims the priority of U.S. Provisional Patent Application No. 63/039,589, filed Jun. 16, 2020, and European Patent Application No. 20180178.4, filed Jun. 16, 2020, each of which are incorporated herein by reference in their entirety.

TECHNOLOGY

The present invention relates generally to image coding and rendering, and in particular, to representing volumetric video in saliency video streams.

BACKGROUND

Through volumetric video streaming and rendering, a viewer may view scenes depicted in 360 degree video images from any point within a viewing volume. As the viewer moves by translations or rotations with up to six degrees of freedom in the viewing volume from time to time, the viewer may be presented with viewpoint specific imagery responsive to the viewer's movements. Needless to say, the amount of desired video data to support a seamless high quality experience at all time in the volumetric video streaming and rendering would be enormous, difficult and even impractical to support, given the amount of bandwidth and computing power required to compress and decompress the video data.

Furthermore, due to the large amount of video data streaming and video processing operations in volumetric video applications, significant time lags could be expected to occur while high quality image content is being streamed, processed, and rendered to the viewer in real time. These significant time lags could occur frequently. especially if the viewer would keep making body and head movements or pose changes in the viewing volume. Frequently occurring significant time lags in volumetric video applications could be readily perceived by viewers. thereby severely affecting viewer experiences with these volumetric video applications.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 4A and FIG. 4B illustrate example process flows; and

DESCRIPTION OF EXAMPLE EMBODIMENTS

Figure 1B:
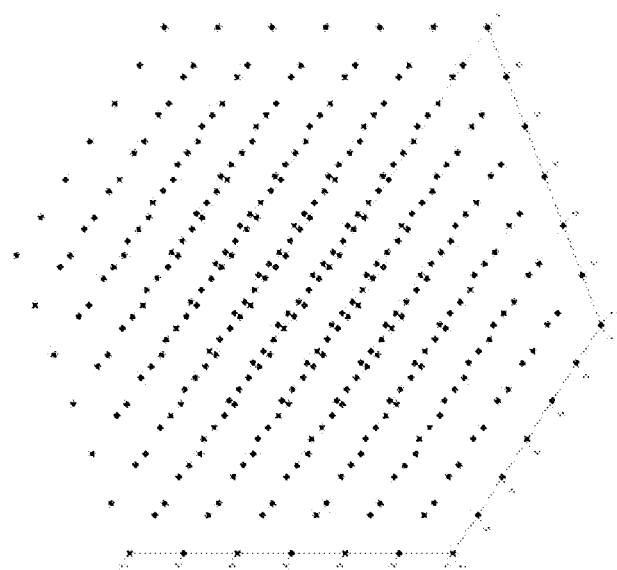
FIG. 1B illustrates example views supported by volumetric video.

Example embodiments, which relate to representing volumetric video in saliency video streams, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. General Overview
2. Volumetric Video
3. Saliency Stream Based Volumetric Video
4. Saliency Stream Based Volumetric Video Delivery Pipeline
5. Example Video Streaming Server and Client
6. Saliency Regions and Disocclusion Data
7. Example Process Flows
8. Implementation Mechanisms—Hardware Overview
9. Equivalents, Extensions, Alternatives and Miscellaneous

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Techniques as described herein can be used to significantly reduce data in volumetric video streaming and decoding. Volumetric video as described herein may be represented with a set of saliency video streams and a base stream, together with metadata. Each saliency video stream in the set tracks a collection of contiguous pixels or a saliency region in the scene and is associated or assigned with a saliency rank. Saliency ranks may be adaptively assigned, for example based on live feedback.

Image data for a saliency region can be independently streamed in a saliency video stream to a recipient video decoder. The image data encoded in the saliency video stream for the saliency region may depict one or more of: a highly interesting object and/or zero or more less interesting objects. a bounded region, a region of interest or ROI, an image area pre-designated by a content creator or director, an image area determined through viewer statistical information gathering and analyses. an image area generated through padding to an image object recognized through computer vision techniques, and so on.

A saliency region represented in a saliency video stream may be dynamically expanded, shrunk, merged or split from one scene to next, from one group of pictures (GOP) to next, etc. Thus, the set of saliency video streams in the volumetric video may be dynamically changed to include different saliency video streams as well as different counts of saliency video streams for different scenes, different GOPs, etc.

Each saliency video stream comprises motion estimation and/or neighboring pixel information to allow or enable the recipient decoder device to perform predictive coding operations and construct an image portion represented by the image data carried in the saliency video stream, independent of any other video streams received by the recipient decoder device.

Other image data in other video streams—including but are not limited to: any of base video stream(s), other saliency video stream(s), etc.—may be used by the recipient decoder device to generate or construct other image portions of a scene. The image portions generated or constructed by the recipient decoder device from all the base video stream(s) and saliency video stream(s) may be composited into an overall or full image that depicts the same scene.

Additionally, optionally or alternatively, a disocclusion data portion associated with (or corresponding to) a saliency video stream as described herein can be sent together or separately with the saliency video stream. The disocclusion data portion comprises texture and/or depth image data for image details that may be hidden in a represented view or occluded by (saliency) image details as represented in the saliency video stream. The occluded image details depicted by the disocclusion data portion may become visible in one or more adjacent views to the represented view.

The recipient video decoder can use disocclusion data portion(s) associated with (or corresponding to) respective saliency video stream(s) to generate or construct image(s) for adjacent views, for example through image warping operations, in response to determining that the viewer's current view is not the same as the represented view represented in the saliency video stream(s) but rather is adjacent to the represented view in which occluded image details represented in the disocclusion data portion(s) become visible in the viewer's current view.

Disocclusion data portions for image details that are not visible in a represented view but visible in a single adjacent view or multiple adjacent views to the represented view can be packaged or encoded in a disocclusion atlas. The disocclusion atlas may be used to support encoding multi-depth information for view dependent effects—e.g., different adjacent views may have different image details or features that are specific or only visible to the different adjacent views.

The metadata in the volumetric video as described herein can include information to assist the recipient decoder device to render from the base stream, saliency video streams and/or their accompanying disocclusion atlases.

The base stream in the volumetric video may be, but is not necessarily limited to only, a lower quality representation of the scene that can be used to render non-salient parts of an overall image (or a depicted scene) should a user look there instead of the salient parts of the overall image.

Some or all of the volumetric video represented at least in part with the set of saliency video streams may be encoded, transmitted, delivered, and/or decoded, in video streams encoded with a coding syntax based on a video coding standard or proprietary specification including but not limited to Moving Picture Experts Group (MPEG) video standards. H.264/Advanced Video Coding (H.264/AVC), High-Efficiency Video Coding (HEVC), MPEG-I, Dolby's ViX file format, or the like.

Example embodiments described herein relate to streaming volumetric video. A set of one or more saliency regions in a global scene depicted by the volumetric video is identified. A set of one or more saliency video streams that track the set of one or more saliency regions identified in the global scene is generated. Each saliency video stream in the set of one or more saliency video streams tracks a respective saliency region in the set of one or more saliency regions. A saliency stream based representation of the volumetric video is generated to include the set of one or more saliency video streams. The saliency stream based representation of the volumetric video is transmitted to a video streaming client.

Example embodiments described herein relate to rendering volumetric video. A saliency stream based representation of the volumetric video from a video streaming server is received. The saliency stream based representation includes a set of one or more saliency video streams. The set of one or more saliency video streams track a set of one or more saliency regions identified in a global scene that is depicted in the volumetric video. Saliency region image data is derived from the set of one or more saliency video streams. The saliency region image data comprises a respective image portion depicting each saliency region in the set of one or more saliency regions tracked by the set of one or more saliency video streams. One or more reconstructed images are caused to be generated at least in part from the image data. The one or more reconstructed images depict the global scene. The one or more reconstructed images are rendered on an image display to a viewer.

In some example embodiments, mechanisms as described herein form a part of a media processing system, including but not limited to any of: cloud-based server, mobile device, virtual reality system, augmented reality system, head up display device, helmet mounted display device, CAVE-type system, wall-sized display, video game device, display device, media player, media server, media production system, camera systems, home-based systems, communication devices, video processing system, video codec system, studio system, streaming server, cloud-based content service system, a handheld device, game machine, television, cinema display, laptop computer, netbook computer, tablet computer, cellular radiotelephone, electronic book reader, point of sale terminal, desktop computer, computer workstation, computer server, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Volumetric Video

In pursuit of high visual quality, video resolution has been continuously increasing towards human eye resolution. An immersive video such as 360 degree video, which allows a viewer to look in any direction from a fixed position, has a very large number of pixels.

Techniques as described herein can be used to provide view-specific video with full parallax to a viewer responsive to the viewer's body or head motions up to all six degrees of freedom. As used herein, the term "view-specific" video (image) may mean position-specific and/or orientation-specific video (image) that is generated and/or rendered based at least in part on—or in response to a determination of—a viewer's position and/or orientation.

To achieve this, videos at a set or subset of different points in space—corresponding to a set or subset of different positions and/or different orientations that span a viewing volume in which the viewer is free to move—may be used to generate view-specific images rendered to the viewer. The videos at these different points in space may comprise texture videos as well as depth videos and form reference views (or reference viewpoints) of a volumetric video.

A virtual view for a given position and/or orientation of the viewer—which may not be coinciding with any of these reference views—can be synthesized from these reference views of the volumetric video using image based rendering techniques.

Figure 1A:
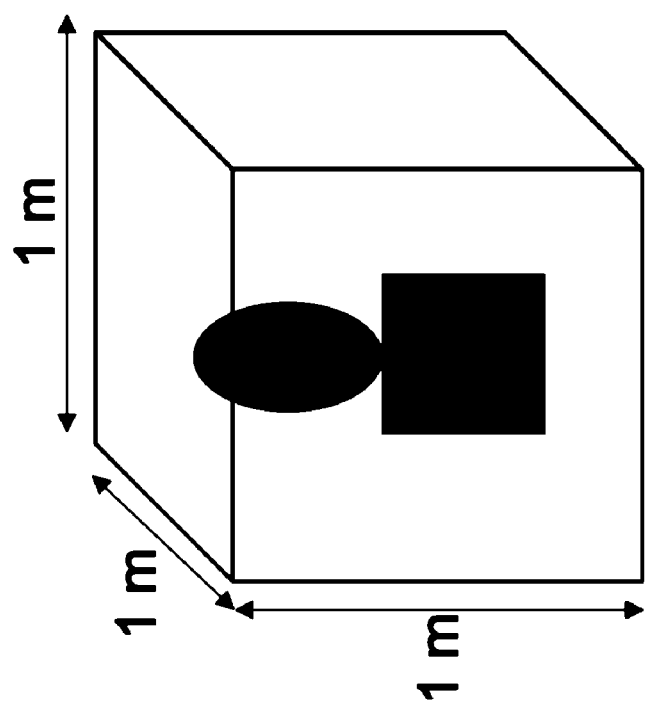
FIG. 1A illustrates an example viewing region in which a viewer may make body or head motions to change into different poses.

FIG. 1A illustrates an example viewing region in which a viewer may make body or head motions to change into different poses with different (viewing) positions and/or different (viewing) orientations. In various embodiments, the viewing region may be a 2-dimensional (2D) spatial area, a 3-dimensional (3D) spatial volume, etc. By way of example but limitation, the viewing region is a 3D viewing volume of 1 meter×1 meter×1 meter dimensions. The viewer can have up to six degrees of freedom in the 3D viewing volume to view view-specific images rendered from the volumetric video. The six degrees of freedom refer to three degrees of freedom for translational movements (e.g., linear motions, etc.) along three linear dimensions and three degrees of freedom for angular movements (e.g., rotations, yaw, pitch, roll, etc.) along three angular axes. Within the viewing volume, the volumetric video can be streamed, decoded and/or processed to generate view-specific images rendered to the viewer, responsive to the viewer's positions and/or orientations and/or changes thereof.

FIG. 1B illustrates an example plurality of different points in space representing a plurality of views supported by volumetric video. The volumetric video comprises a plurality of texture and depth videos for the plurality of views. Each texture and depth video in the plurality of texture and depth videos represents or corresponds to a respective view in the plurality of views.

By way of illustration but not limitation, the plurality of different points in space representing the plurality of views may be located at a plurality of vertices (or grid points) of a 3-dimensional (3D) grid in a spatial volume corresponding to a viewer's viewing volume.

The plurality of texture and depth videos comprises a plurality of sequences of (e.g., 360 degree, immersive, 2D, 3D, etc.) texture video images for the plurality of different views as well as a plurality of sequences of (e.g., 360 degree, immersive, 2D, 3D, etc.) depth video images for the plurality of different views.

A sequence of texture video images (in the plurality of sequences of texture video images) for a view in the plurality of different views corresponds to a respective sequence of depth video images (in the plurality of sequences of depth video images) for the same view. Additionally, optionally or alternatively, each (e.g., 360 degree. immersive, 2D, 3D, etc.) texture video image (or frame) in the sequence of texture video images corresponds to a respective (e.g., 360 degree, immersive, 2D, 3D, etc.) depth video image (or frame) in the sequence of depth video images.

Figure 1D:
FIG. 1D illustrates an example depth image.
Figure 1C:
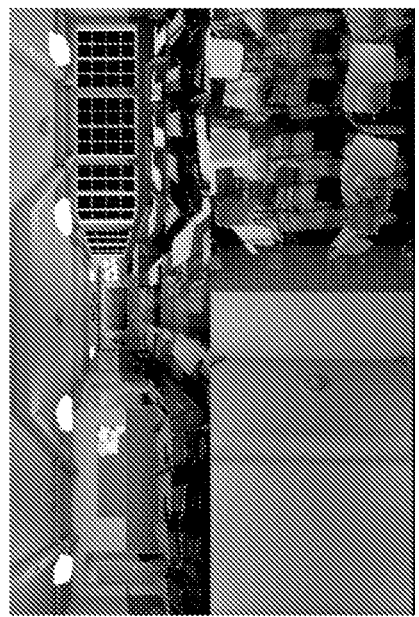
FIG. 1C illustrates an example texture image.

FIG. 1C illustrates an example texture image for a view in a plurality of views, whereas FIG. 1D illustrates a corresponding depth image for the same view. As used herein, a texture image refers to an image comprising pixels in different spatial locations of an image frame in which each pixel is specified with individual color or brightness information such as RGB pixel values, YCbCr pixel values, luma and/or chroma pixel values, or the like. A depth image refers to an image corresponding to a texture image and comprising pixels in different spatial locations of an image frame in which each pixel is specified with spatial depth information of a corresponding pixel of the texture image such as z-axis values, depth values, spatial disparity values, parallax information, or the like.

3. Saliency Stream Based Volumetric Video

A naïve volumetric video renderer may attempt to decode a large number of (e.g., high resolution 360 degree, etc.) reference view images for every time point (e.g., corresponding to a frame or frame index, etc.) in a sequence of time points, for example to form sufficiently dense views for image based rendering at every such time point. However, it may not be feasible to transmit a huge number of pixels in numerous sufficiently dense views from an upstream device to a recipient decoder device over available data rates supported by most network infrastructure. In addition, it may not be feasible for the recipient decoder device to decode a correspondingly huge amount of image data with available client resources on the decoder side.

One can consider encoding the reference view videos in tiles and decoding only current tiles relating to the viewer's current view. However, as the viewer's position and/or orientation changes with time, different sets of current tiles are needed under this approach; however, precedent (in time) tiles—which comprise motion estimation and/or neighboring pixel values for the current tiles and thus are needed to decode the current tiles—may be missing or may need to be recursively downloaded to the decoder side, thereby leading to likely visual artifacts and/or perceptible time lags in video rendering operations.

Techniques as described herein can be used to significantly reduce data volumes in volumetric video streaming and resource usages on the decoder side to decoder and render volumetric video.

Under these techniques, each reference view image (e.g., a grid point in grid points of a cubic volume of FIG. 1B. etc.) in a set of reference view images (e.g., the grid points of the cubic volume of FIG. 1B, etc.) of volumetric video can be represented—or can be converted to a representation—using saliency video streams. A saliency video stream as described herein tracks (e.g., dynamically, etc.) a spatial region in a scene as depicted in the volumetric video and as viewed by a viewer from a reference view represented by the saliency video stream. The spatial region tracked with the saliency video stream may dynamically move from one image area/location of the scene to another image area/location of the scene.

In some operational scenarios, spatial regions tracked with saliency video streams can completely cover an entire (e.g., 360 degree, immersive, 2D, 3D, reference view, etc.) image. However, in many if not all operational scenarios, only a relatively few saliency video streams are used to track only a relatively few spatial regions covered by the entire image. These spatial regions tracked by the saliency video streams may cover image areas/locations, which are accumulated or aggregated to less than 10 angular degrees out of 360 angular degrees, less than 10%, or the like, in the entire image. As a result, amounts of image data and image metadata in connection with saliency video streams can be kept to a relatively (e.g., significantly. etc.) small amount as compared with other (e.g., uncompressed, source, raw image data, uniformly high resolution or high quality, etc.) representations of the same volumetric video.

Figure 2A:
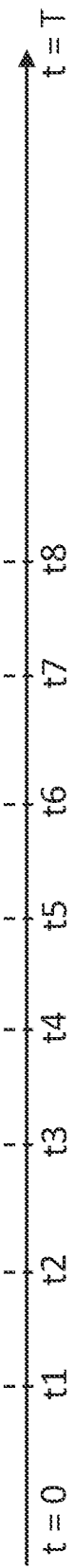
FIG. 2A illustrates an example saliency-stream based representation for a reference view.

FIG. 2A illustrates an example saliency-stream based representation for a reference view (e.g., a grid point in grid points of a cubic volume of FIG. 1B, etc.) in a set of reference views (e.g., the grid points of the cubic volume of FIG. 1B, etc.) encoded or included in a sequence of multi-view images of volumetric video. The sequence of multi-view images of the volumetric video may correspond to a sequence of time points (e.g., t1, t2, ..., t8, ..., etc.) over a time duration/interval (e.g., from t=0 to t=T, etc.) of a volumetric video application. Each multi-view image may correspond to a respective time point in the sequence of time points and may comprise a set of reference view images corresponding to the set of reference views.

As depicted in FIG. 2A, the representation of the reference view in the set of reference views encoded or included in the sequence of multi-view images of the volumetric video image comprises a base video stream, a set of saliency video streams, image metadata, (additionally, optionally or alternatively) disocclusion data, and so on.

In various embodiments, the set of saliency video streams may comprise zero, one or more saliency video streams. In the present example as illustrated in FIG. 2A, the set of saliency video streams comprise multiple saliency video streams such as saliency video stream 1, saliency video stream 2, and so forth.

The base video stream comprises a sequence of base video images (e.g., B-1, B-2, ..., B-8, ..., etc.). Saliency video stream 1 comprises a sequence of first saliency video images (e.g., S1-1, S1-2, ..., S1-8, ..., etc.). Saliency video stream 2 comprises a sequence of second saliency video images (e.g., S2-1, S2-2, ..., S2-8, ..., etc.). Disocclusion data comprises a sequence of disocclusion data portions (e.g., D-1, D-2, ..., D-8, ..., etc.). Image metadata comprises a sequence of image metadata portions (e.g., M-1, M-2, ..., M-8, ..., etc.).

For a given time point (e.g., t1, a given frame or frame index in a sequence of multi-view frames or frame indexes, etc.), a multi-view image in the sequence of multi-view images of the volumetric video image comprises a set of reference view images for the set of reference views. A reference view image in the set of reference view images corresponds to a respective reference view in the set of reference views.

Under techniques as described herein, each reference view image in the set of reference view images for a given time point (e.g., t1, a given frame or frame index, etc.) may be represented with a combination of some or all of base image data encoded in the base video stream, saliency image data encoded in the set of saliency video streams, an image metadata portion included in the image metadata. a disocclusion data portion included in the disocclusion data, and so forth.

For example, as illustrated in FIG. 2A, for a first time point t1, a first reference view image in first set of reference view images of a first multi-view image in the sequence of multi-view images in the volumetric video is represented by a combination of a first base video image B-1 encoded in the base video stream, a saliency video image S1-1 encoded in saliency video stream 1, a saliency video image S2-1 encoded in saliency video stream 2, ... a first image metadata portion M-1 included in the image metadata, a first disocclusion data portion D-1 included in the disocclusion data, and so forth. Similarly, for a second time point t2, a second reference view image in a second set of reference view images of a second multi-view image in the sequence of multi-view images in the volumetric video is represented by a combination of a second base video image B-2 encoded in the base video stream, a saliency video image S1-2 encoded in saliency video stream 1, a saliency video image S2-2 encoded in saliency video stream 2, ... a second image metadata portion M-2 included in the image metadata, a second disocclusion data portion D-2 included in the disocclusion data, and so forth.

The set of saliency video streams in the representation of the volumetric video as illustrated in FIG. 2A for the corresponding reference view in the set of reference views (e.g., dynamically, adaptively, etc.) tracks a corresponding set of spatial regions (referred to as "saliency regions") in a scene depicted in the volumetric video, as viewed from the corresponding reference view. Each saliency video stream in the set of saliency video streams (e.g., dynamically, adaptively, etc.) tracks a corresponding saliency region (e.g., comprising contiguous pixels, etc.) in the set of saliency regions.

Additionally, optionally or alternatively. each saliency video stream in the set of saliency video streams can be associated or assigned with a saliency rank in a set of saliency ranks respectively assigned to saliency regions forming the set of saliency regions. For example, saliency video stream 1 may be assigned with a first saliency rank, whereas saliency video stream 2 may be assigned with a second saliency rank, which may be the same as or different from the first saliency rank. These ranks may be time dependent or time varying. For example, a saliency region may be tracked in more than one scene, more than one GOP, etc. Depending on saliency ranking factors (e.g., importance, types of objects or characters present in the saliency region versus other types of objects or other characters present outside the saliency region, etc.) adopted or implemented in a system as described herein, the saliency region or the saliency video stream tracking the saliency region may be given the same or different saliency rank(s).

A saliency video stream as described herein may comprise texture and/or depth information (e.g., foreground, visible in a reference view represented by the saliency stream, etc.) in a (tracked) spatial region of a depicted scene in the volumetric video. Additionally, optionally or alternatively, the saliency video stream may be associated with corresponding disocclusion data portions comprising disoccluded texture and/or depth information in the spatial region. Image details encoded or included in the disocclusion data for the spatial region are hidden in or occluded by image details of a reference view represented in the saliency video stream. However, the hidden or occluded image details become visible in at least one neighboring view adjacent to the reference view.

For a set of one or more reference views, saliency video streams can be transmitted at relatively high quality and determined to be relatively highly likely or probable that the viewer is looking at one of saliency regions tracked by the saliency video streams in a saliency stream based volumetric video. To fill in the gaps left by these saliency video streams, a base stream may carry image data depicting the entire rendering space (e.g. a global scene, a rendering space for up to 360 degree images, etc.) covered by the saliency stream based volumetric video for each reference view in the set of reference views. This base video stream can be of a lower quality with lower resolution, higher compression, lower framerate, etc.,—as compared with the saliency video streams—in the interest of saving bits to be encoded or transmitted. A viewer who looks in an unexpected direction away from the saliency regions tracked by the saliency video streams can be shown image data derived, warped and/or rendered from this base video stream. A lower quality version depiction of saliency regions tracked by the saliency video streams can be either left in the base video stream or masked out (or excluded from) in the base video stream.

Disocclusion data comprising disocclusion data portions for respective reference view images can be used to support encoding multi-depth information for view dependent effects. For example, image details such as highlight speckles may appear in some but not all views and when visible may appear differently in different views. Multi-depth information including but not limited to multiple sets of different texture and/or different depth information of view-dependent image details that are hidden or occluded in the reference view may be encoded in the disocclusion data and delivered to a recipient video decoder so that view-dependent image details (or effects) can be correctly rendered or presented to a viewer in response to detected changes in the viewer's position or orientation.

The image metadata sent along with the base video stream and the saliency video streams may comprise additional information to image data and depth data included in the base video stream and the saliency video streams.

The image metadata may include, but is not necessarily limited to only. geometric information associated with the reference view and/or spatial regions represented in a combination of the base video stream and the saliency video streams, geometric information associated with adjacent views in connection with texture and depth information included in the disocclusion data, or the like. For example, a spatial region tracked by a saliency video stream may move from one location of a depicted scene to another location of the depicted scene. Geometric information for the spatial region including but not limited to: location information, dimension information, size information, etc., may be included in an image metadata portion of the image metadata.

4. Saliency Stream Based Volumetric Video Delivery Pipeline

In some operational scenarios, for each of some or all saliency region images in saliency video streams of salient stream based volumetric video, an image metadata portion may be transmitted with a corresponding saliency video stream to convey the stride of the saliency region of the saliency video stream in a global scene depicted in the salient stream based volumetric video. The stride of the saliency region may capture time constant or time varying locations the saliency region within the global scene, time constant or time varying sizes of the saliency region, time constant or time varying velocity of the saliency region in relation to other image areas/regions within the global scene, etc. The image data can also carry information about zoom (e.g., a ratio of spatial resolutions between a saliency video stream and a base video stream, etc.), padding (e.g., pixels in a saliency region but outside an object in the saliency region that is used to determine or identify the saliency region, etc.), etc. Additionally, optionally or alternatively, image metadata may comprise a description of fragments, parts, patches, etc., in a disocclusion atlas as described herein. The image metadata may be delivered as a part of the saliency stream based volumetric video from an upstream device to a recipient device and used to help the recipient device render image data decoded from the saliency video streams and the disocclusion atlases. In some operational scenarios, in the absence of such image metadata, a volumetric video renderer as described herein can fall back on images or image areas/regions decoded from base video stream(s).

Figure 3A:
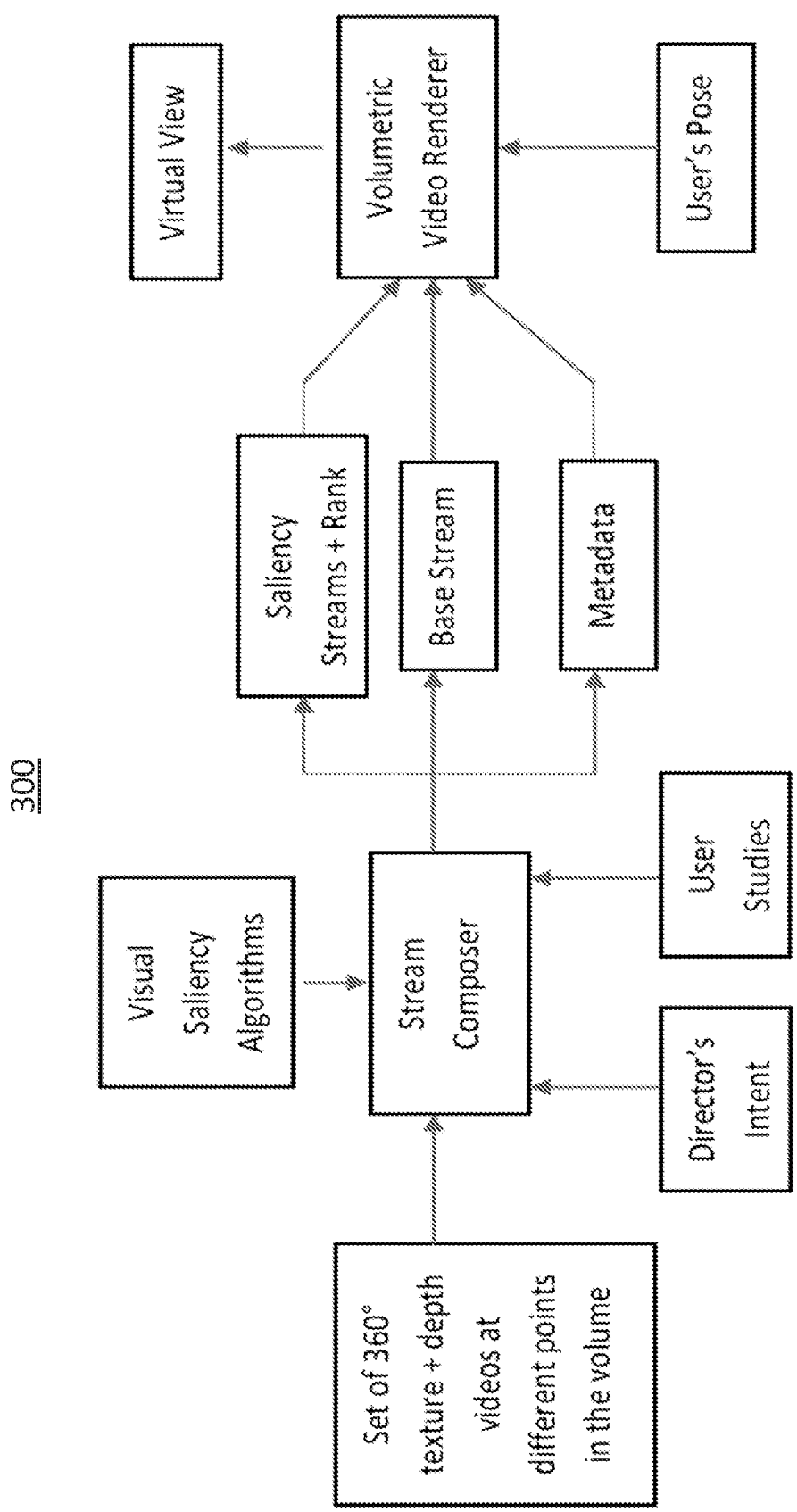
FIG. 3A through FIG. 3C illustrate example saliency stream based volumetric video streaming.

FIG. 3A illustrates an example video delivery pipeline 300 that delivers, from an upstream device such as a video encoder to a recipient device such as a video decoder, a saliency stream based representation of volumetric video comprising image data, image metadata and/or disocclusion data for rendering view-specific video content to a viewer responsive to changes in the viewer's position and/or orientation in a viewing volume.

The upstream device in the pipeline (300) receives, as input (denoted as "set of 360° texture+depth videos at different points in the volume") from an external video data source, a sequence of multi-view images encoded in a plurality of (e.g., 360 degree, immersive, 2D, 3D, non-saliency-stream-based, etc.) reference texture and depth videos for a plurality of reference views. As illustrated in FIG. 1B, the plurality of reference views may be represented as a plurality of different grid points in a spatial volume (denoted as "different points in the volume") that corresponds to the viewer's viewing volume.

Each reference texture and depth video in the plurality of reference texture and depth videos corresponds to a respective reference view in the plurality of different reference views represented in the sequence of multi-view images. Each such reference texture and depth video for the respective reference view comprises a sequence of (e.g., relatively high-quality, relatively high resolution, consecutive, etc.) single-view reference texture images for the respective reference view and a sequence of (e.g., relatively high-quality, relatively high resolution, consecutive, etc.) single-view reference depth images for the respective reference view.

The sequence of multi-view images, as encoded in the received input by the upstream device of the pipeline (300), corresponds to—or is respectively indexed by—a sequence of time points over a time duration/interval of a volumetric video application. For a given time point in the sequence of time points, each multi-view image in the plurality of multi-view images comprises a plurality of single-view reference texture images for the plurality of reference views and a plurality of single-view reference depth images for the same plurality of reference views. Each single-view reference texture image in the plurality of single-view reference texture images of the multi-view image corresponds to the given time point; corresponds to a respective reference view in the plurality of reference views; and corresponds to a respective single-view reference depth image of the same respective reference view in the plurality of single-view reference depth images of the multi-view image. Each such single-view reference texture image and its respective single-view reference depth image may be respectively derived or determined from a sequence of (e.g., relatively high-quality, relatively high resolution, consecutive. etc.) single-view reference texture images for the respective reference view as represented in a respective reference texture and depth video in the received plurality of reference texture and depth videos and a sequence of (e.g., single-view, relatively high-quality, relatively high resolution, consecutive, etc.) single-view reference depth images for the same respective reference view as represented in the same respective reference texture and depth video.

A pair of single view texture or depth images as described herein derived from a reference texture and depth video for a reference view may be indexed with a time point. The texture image in the pair comprises up to 360 degree texture information (e.g., luminance, chrominance, RGB values, YCbCr values, etc.) for the time point and the reference view, whereas the depth image in the pair represents up to 360 degree depth information (e.g., depth values, z values, disparity values, parallax values, etc.) for the time point and the reference view.

The upstream device of the video delivery pipeline (300) includes a stream composer that generates or composes a (e.g., real time, near real time, etc.) volumetric video stream to be streamed from the upstream device to the recipient device. Under techniques as described herein, the volumetric video stream can be represented at least in part by saliency video streams derived from the received plurality of 360 degree texture and depth videos by the upstream device of the video delivery pipeline (300).

The volumetric video stream is encoded with base video image data, saliency image data, image metadata, disocclusion data, etc., that represent one or more reference views (e.g., one or more grid points of a cubic volume of FIG. 1B, etc.). For example, as depicted in FIG. 2A, each of the one or more reference views represented in the volumetric video stream to be streamed (e.g., delivered or transmitted directly or indirectly, etc.) from the upstream device to the recipient device comprises a base video stream, a set of saliency video streams, image metadata, (additionally, optionally or alternatively) disocclusion data, and so on.

In some operational scenarios, it is possible or permissible to have the one or more reference views represented in the volumetric video stream—to be streamed from the upstream device to the recipient device—to include up to all reference views represented in the received plurality of reference texture and depth videos by the upstream device.

However, in many if not all operational scenarios, the one or more reference views represented in the volumetric video stream represented only a (e.g., proper, etc.) subset of reference views that may be selected from the plurality of reference views included in the plurality of texture and depth videos received as input by the upstream device of the pipeline (300). The one or more reference views in the to-be-streamed volumetric video stream may be selected, from among the plurality of reference views, based at least in part on real time or near real time viewpoint data collected while the viewer is viewing video content depicted in the video stream represented with saliency video streams.

The stream composer retrieves or extracts image data and/or image metadata for the one or more reference views from the plurality of received texture and depth videos ("set of 360° texture+depth videos at different points in the volume") as received by the stream composer to generate the saliency stream based volumetric video for the one or more reference views. For example, the stream composer can retrieve or extract a respective image data and/or image metadata portion for each reference view in the one or more reference views from the plurality of received texture and depth videos ("set of 360° texture+depth videos at different points in the volume") to generate a saliency stream based volumetric video portion for the reference view.

As depicted in FIG. 2A, the saliency stream based volumetric video portion for the reference view comprises a (e.g., dynamically determined, adaptively determined, saliency region dependent, etc.) combination of: a base video stream (denoted as "base stream"), a set of one or more saliency video streams (denoted as "saliency streams") tracking one or more saliency regions, one or more saliency video stream ranks (denoted as "rank") associated or assigned with the one or more saliency video streams, image metadata and/or disocclusion data (denoted as "metadata") associated with the base video stream and the one or more saliency video streams, etc.

The one or more saliency regions tracked by some or all sets of saliency video streams in some or all of the one or more reference views in the saliency stream based volumetric video may be identified and/or ranked by one or more of: input from content creator(s) or director(s) (denoted as "director's intent"), viewer statistical information gathering and analyses (denoted as "user studies"), visual saliency algorithms based at least in part on computer vision techniques, and so forth. Director's intent may indicate what spatial regions of a depicted global scene viewers are expected to look. Visual saliency algorithms may apply computer vision techniques and/or machine learning to detect image features, objects, and/or characters as salient parts of the scene with respective saliency scores or ranks. User studies involving a population of viewers may be used to determine saliency regions based on statistics and/or statistical analyses. Example user studies are described in U.S. Provisional Patent Application No. 62/423,287, "PREDICTING AND VERIFYING REGIONS OF INTEREST SELECTIONS," filed on Nov. 17, 2016, by Chaitanya Atluru et al., the entire contents of which are hereby incorporated by reference as if fully set forth herein.

The saliency stream based volumetric video as generated by the stream composer can be directly or indirectly transmitted to a recipient device (e.g., a video decoder, a set-top device, an intelligent TV, a video streaming client, etc.) or a volumetric video renderer therein for decoding. composing and rendering view specific images or scenes to the viewer corresponding to the viewer's current view (denoted as "virtual view") that may or may not be coinciding with any of the one or more reference views represented in the saliency stream based volumetric video. The viewer's current view may be determined from the viewer's position or orientation (denoted as "user's pose") tracked with one or more of: sensors, motion trackers, eye trackers, etc. The saliency stream based volumetric video may be streamed or delivered directly or indirectly to recipient devices via one or more data network connections, tangible computer-readable storage media, and so forth.

As compared with the plurality of reference texture and depth videos received as input, the saliency stream based volumetric video is much compressed for bitrate, decoding and rendering efficiencies. A base video stream in the saliency stream based volumetric video can comprise a sequence of a relatively low quality, relatively low resolution (up to 360 degree) base video images for the sequence of time points over the time duration/interval of the volumetric video application. Each base video image in the sequence of base video images, which may be indexed with a respective time point (or frame index) in the sequence of time points (or frame indexes), comprises image data of a relatively low resolution, relatively low color precision, relatively low dynamic range, etc., as compared with an image in the plurality of reference texture and depth videos received as input by the video delivery pipeline (300). As a result, a large amount of image data in the input plurality of reference texture and depth videos received as input by the video delivery pipeline (300) can be reduced to a relatively small amount of image data in the base video stream.

Saliency regions (e.g., image regions, image areas, image parts, image patches, etc.) tracked by saliency video streams individually and/or in combination may be relatively small as compared with an entire (e.g., 360, immersive, 180 degree, etc.) video image represented in a base video stream. As a result, image data in these saliency regions as encoded in the saliency video streams can be kept or reduced to a relatively small amount.

Additionally, optionally or alternatively, as image data of a set of one or more reference views as encoded in the saliency stream based volumetric video depicts the same set of scenes, the upstream device or the stream composer therein can exploit data redundancy in the image data between or among different reference views in the set of one or more reference views and apply inter-view as well as intra-view predictive coding techniques to further reduce data volumes to be transmitted from the upstream device to the recipient device. Example inter-view predictive coding techniques are described in U.S. Provisional Patent Application No. 62/518,187, "CODING MULTIVIEW VIDEO," filed on Jun. 12, 2017, by Haricharan Lakshman et al., the entire contents of which are hereby incorporated by reference as if fully set forth herein.

The recipient device (e.g., a wearable device, a VR client device, an AR client device, a video decoder, etc.) operating with an image display to render view specific images to a viewer can determine the viewer's positions or orientations in real time or in near real time by using position sensors, motion sensors, eye tracking devices, etc., to collect real time or near real time viewpoint data in connection with the viewer's positions or orientations. The viewer's position or orientation at a given time point may be monitored and determined by the recipient device in real time or near real time (e.g., with a latency of 1 or 5 milliseconds or 20 milliseconds, with a strict latency below a perceptible time lag threshold or budget, etc.).

In some operational scenarios, the viewpoint data and/or the viewer's positions or orientations determined from the viewpoint data may be signaled/provided to by the recipient device to the upstream device such as a just-in-time video streaming server. Based on the viewer's specific position or orientation at a specific time point, the upstream device can identify, from among the plurality of reference views received in the plurality of reference texture and depth videos, a set of one or more reference views that are determined to be near (e.g., one or more nearest, etc.) to a virtual view represented by the viewer's specific position or orientation. Image data for the set of one or more reference views, as retrieved or extracted from the plurality of reference texture and depth videos, is used to generate the saliency stream based volumetric video, which can then be streamed or delivered to the recipient device over one or more data links (or computer network paths).

In some operational scenarios, the viewpoint data and/or the viewer's positions or orientations determined from the viewpoint data may not be signaled/provided to by the recipient device to the upstream device. The upstream device can retrieve or extract image data for the set of one or more reference views for some or all of the plurality of reference views, as represented in the plurality of reference texture and depth videos, to generate the saliency stream based volumetric video, which can then be streamed or delivered to the recipient device over one or more data links (or computer network paths).

For a given reference view in the set of one or more reference views of the saliency stream based volumetric video, a base video stream as described herein may comprise a relatively low quality representation of depicted scenes in the entire image area represented in the given reference view. In the meantime, a set of one or more saliency video streams may be used to track saliency region(s) of the depicted scenes. While the viewer is free to view any image location, area or region of a depicted scene in a volumetric video application, the saliency region(s) cover image locations, areas or regions of the depicted scene that are determined or predicted as mostly likely to be viewed by the viewer.

On the decoder side, some (e.g., highest ranked, etc.) or all saliency video streams in the set of saliency video streams carried in the saliency stream based volumetric video for the given reference view may be decoded along with the base video stream for the given reference view. For a given time point in the given reference view, the recipient device or the volumetric video renderer therein can superimpose relatively high quality imagery (or image portion(s) of the saliency region(s)) constructed or generated from the saliency video streams on a relatively low quality image constructed or generated from the base video stream, thereby reproducing or reconstructing the given reference view that has high quality image data everywhere the viewer is determined or predicted to be most likely to look, even with no or little eye tracking data informing the viewer's current positions or orientations.

The recipient device or the volumetric video renderer therein decodes some or all base video image data, saliency video image data, image metadata, disocclusion data, etc., for the set of one or more reference views from the saliency stream based volumetric video. The recipient device or the volumetric video renderer therein performs image warping/blending with respect to a set of reference view images (for the set of one or more reference views and for the specific time point) as decoded from the saliency stream based volumetric video to generate a view specific image corresponding to the virtual view represented by the viewer's specific position or specific orientation (for the specific time point). The view specific image may be provided by the recipient device in an output (e.g., HDMI, etc.) video signal to the image display operating in conjunction with the recipient device for rendering to the viewer for the specific time point.

6. Saliency Regions and Disocclusion Data

In some operational scenarios, at the beginning of a GOP of inputted full resolution images depicting a global scene, saliency regions in the global scene depicted by the GOP are identified and a saliency video stream may be initialized at the beginning (e.g., an I-frame, instantaneous decoder refresh picture, clean random access picture, broken link access picture, etc.) of the GOP for each of any, some or all of the identified saliency regions.

The detection or identification of these saliency regions can be based on director's intent, user studies, output generated from visual saliency algorithms, and so forth. For example, a saliency video stream can track a saliency region containing an object in the foreground, other image details adjacent to or accompanying the object in the foreground, background imagery within a spatial shape (e.g., a rectangle, a non-rectangle, a regular shape, an irregular shape, etc.) of the saliency region, etc. The saliency video stream may be composed by following the saliency region or one or more objects/characters therein in the global scene throughout the GOP of inputted full resolution images.

The initialization of the saliency video stream can be made with an I-frame, instantaneous decoder refresh picture, clean random access picture, broken link access picture, etc., in a GOP of saliency regional images depicting the saliency region. The GOP of saliency regional images corresponds to, and is derived from, the GOP of inputted full resolution images depicting the global scene.

When saliency regions of saliency video streams collide within a GOP or from GOP to GOP, some or all colliding saliency video streams may be regrouped into a new GOP starting with a new I-frame, instantaneous decoder refresh picture, clean random access picture, broken link access picture, etc., for the new GOP. Conversely, when a saliency region of a saliency video stream diverges within a GOP or from GOP to GOP, the diverging saliency video stream may be split into two or more new GOPs each starting with a new respective I-frame, instantaneous decoder refresh picture, clean random access picture, broken link access picture, etc., for a corresponding new GOP.

The number of saliency video streams in (e.g., one or more reference views of, etc.) saliency stream based volumetric video is scene dependent. In some operational scenarios, saliency video streams can be so designed or identified that their union is the entire (up to 360 degree) global scene depicted in the inputted full resolution images received by a stream composer as described herein. On the other extreme, for some global scenes, just one saliency video stream may be used to track a single and very dominant saliency region in the global scenes.

Figure 2B:
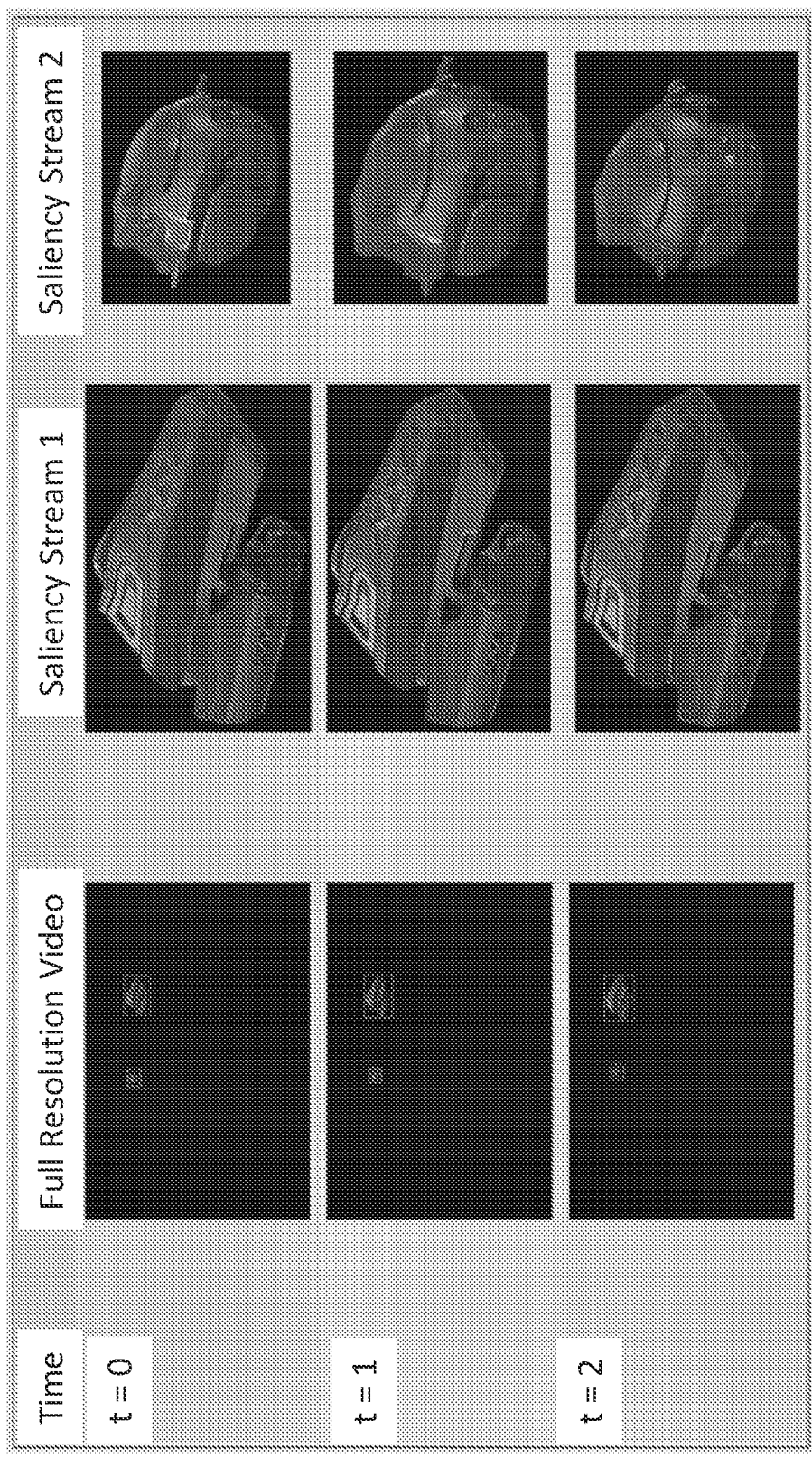
FIG. 2B illustrates example full resolution and saliency video streams for a reference view.

FIG. 2B illustrates example full resolution and saliency video streams for a reference view among a plurality of reference views. A reference texture and/or depth video (denoted as "full resolution video") for the reference view may be received by an upstream device or a stream composer therein (e.g., as shown in FIG. 3A, etc.) as a part of an overall input.

The reference texture and/or depth video for the reference view comprises a sequence of full resolution images that are partitioned into a set of global scenes, GOPs of full resolution images, etc. For example, as illustrated in FIG. 2B, the reference texture and/or depth video comprises a scene, GOP, etc., that includes three full resolution images at t=0, 1, 2, and so on. By way of illustration but not limitation, each of the three full resolution images in the reference texture and/or depth video may comprise a first saliency region and a second saliency region.

Two saliency video streams may be composed by following the first and second saliency regions. Image data of the first saliency region in the overall (or global) depicted scene, the GOP of the full resolution images, etc., in the reference texture and/or depth video ("full resolution video")—including but not limited to the three full resolution images—may be encoded as a first local or saliency regional scene, a first GOP of partial images covering (e.g., only, etc.) the first saliency region, etc., into a first saliency video stream (denoted as "saliency stream 1"). Similarly, image data of the second saliency region in the overall (or global) depicted scene, the GOP of the full resolution images, etc., in the reference texture and/or depth video ("full resolution video")—including but not limited to the three full resolution images—may be encoded as a second local or saliency regional scene, a second GOP of partial images covering (e.g., only, etc.) the second saliency region, etc., into a second saliency video stream (denoted as "saliency stream 2").

A saliency video stream tracking a saliency region in a depicted (or global) scene can be compressed to a relatively great extent and transmitted at significantly low data rates as compared with transmitting 360 videos at a full resolution (e.g., a relatively high resolution in reference texture and/or depth videos, etc.) everywhere.

For example, predictive coding operations may be applied to a saliency video stream as described herein to (e.g., significantly, greatly, etc.) compress or encode image data for a saliency region tracked by the saliency video stream. Motion estimation for inter prediction and/or neighboring pixel values for intra prediction, inter-view prediction information, etc., may be coded into the saliency video stream.

For the first saliency video stream ("saliency stream 1") of FIG. 2B, a saliency regional image comprising image data for the first saliency region at t=0 may be coded as a I-frame, whereas saliency regional images comprising image data for the first saliency region at t=1 and 2 may be coded as non-I-frames. The recipient device can perform inter predictive coding, decode the non-I-frames from the first saliency video stream, and construct first saliency regional images from the non-I-frames as well as earlier decoded frame(s) including the I-frame at t=0 from the first saliency video stream.

For the second saliency video stream ("saliency stream 2") of FIG. 2B, a saliency regional image comprising image data for the second saliency region at t=0 may be coded as a I-frame, whereas saliency regional images comprising image data for the second saliency region at t=1 and 2 may be coded as non-I-frames. The recipient device can perform inter predictive coding, decode the non-I-frames from the second saliency video stream, and construct second saliency regional images from the non-I-frames as well as earlier decoded frame(s) including the I-frame at t=0 from the second saliency video stream.

Thus, saliency video streams can be decoded without encountering any problem of not having predictive data available (e.g., not having a preceding I-frame, etc.) in time when a viewer's position or orientation changes.

In addition to being capable of greatly reducing data redundancy in a single view, in operational scenarios in which a saliency stream based volumetric video carries multi-view (or MV) video data corresponding to multiple views of a depicted scene as viewed from different points in the viewing volume, inter-view redundancy in the multi-view video data of the saliency video stream may be further exploited to reduce or crunch data rates using inter-view predictive coding (e.g., 3D+MV HEVC, etc.) techniques.

Saliency video streams are given or assigned saliency ranks from the most salient to the least salient. One or more saliency video streams with the highest saliency rank(s) may be encoded and/or decoded, while other saliency video stream(s) with the least saliency rank(s) may be skipped, for example when an available data rate is too low (e.g., below a data rate or bitrate threshold, etc.) or when available resources on the decoder side and/or on the encoder side are too low (e.g., below a resource threshold, etc.). The saliency ranks collectively provide a quality knob or control that can be tuned to the available data rate or the available resources to deliver the best possible viewer experience in a volumetric video application.

Additionally, optionally or alternatively, video content depicted by a set of reference views and/or a set of saliency video streams represented or included in saliency stream based volumetric video can be made adaptive by adjusting relatively saliency ranks of saliency video streams based at least in part on live feedback (e.g., the viewer's positions or locations, virtual views, to be synthesized views, etc.) in real time.

Thus, encoding on the encoder side as well as decoding and rendering operations on the decoder side (or the client side) can become relatively highly optimized by only encoding or decoding the most salient parts (e.g., as determined based on respective saliency ranks of saliency video streams, etc.) of the depicted scene and only rendering saliency regions tracked by saliency video streams in addition to a relatively low resolution overall imagery of the depicted scene from base video stream(s). As a result, the client resource requirements on the decoder side can be significantly reduced.

In some operational scenarios, for each saliency video stream depicting local scenes in a tracked saliency region as viewed from a reference view, a sequence of consecutive disocclusion atlases may be used to encodes parts (or disocclusion data portions) of the local scenes that are not visible as viewed from the reference view, but become visible due to disocclusion in adjacent views such as non-reference views or virtual views determined at runtime based on the viewer's positions or orientations.

The disocclusion atlases may be encoded in an attendant stream (to the reference view) that "sees through" nearer (e.g., foreground, occluding, etc.) objects to capture visual or image details that are hidden from specific vantage points (e.g., view positions, recorded views, represented views, etc.) represented by the reference views.

Figure 2C:
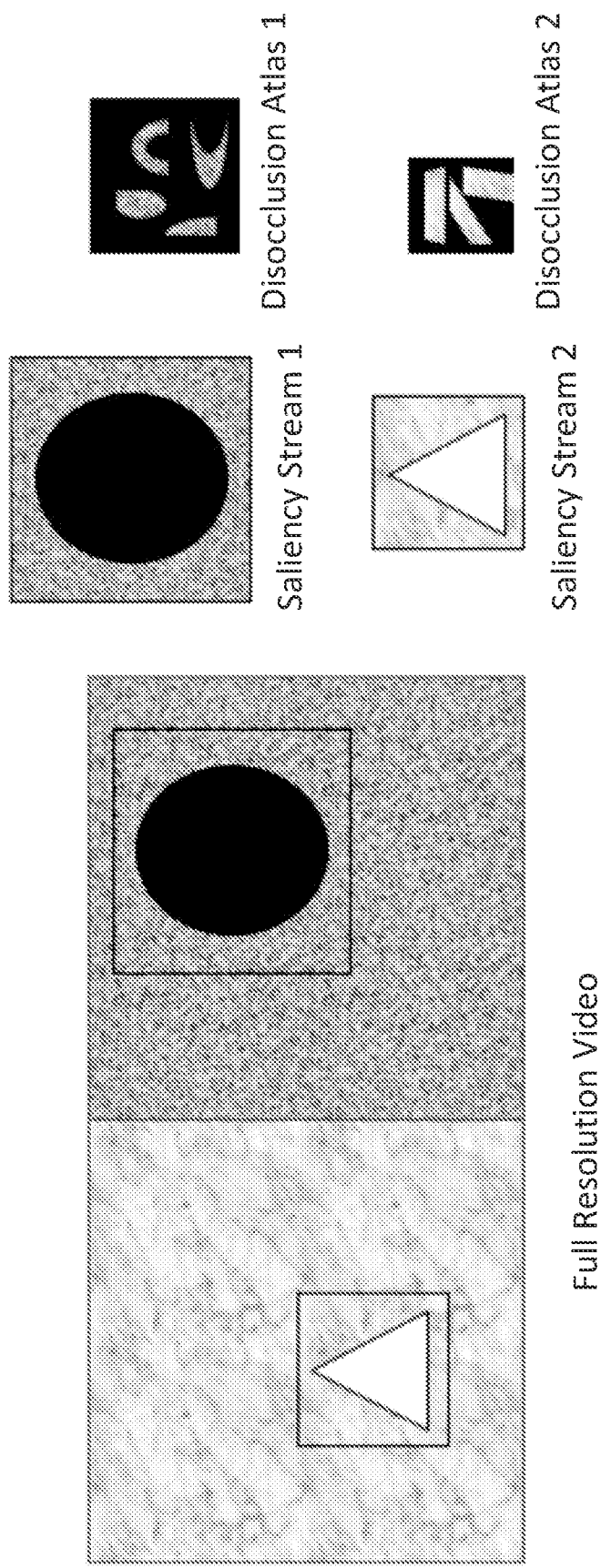
FIG. 2C and FIG. 2D illustrate example saliency video streams and their associated disocclusion data.

FIG. 2C illustrates two example saliency video streams and their associated disocclusion data or atlases. As shown, a full resolution video image in a reference texture and/or depth video as a part of input received by an upstream device or a stream composer therein depicts a toy scene (or a global scene) from a reference view. Two saliency video streams (denoted as "saliency stream I" and "saliency stream 2" respectively) are used to track two saliency regions identified in the toy scene from the reference view. Corresponding to the two saliency video streams ("saliency stream 1" and "saliency stream 2"), two disocclusion atlases (denoted as "disocclusion atlas 1" and "disocclusion atlas 2" respectively) encode parts of local scenes in the two saliency regions that are not visible in the reference view, but become visible in other views (e.g., adjacent to the reference views, virtual views to which the viewer may move, etc.) due to disocclusion.

In some operational scenarios, disocclusion data portions corresponding to an entire (e.g., up to 360 degree, overall, etc.) texture or depth image of a global scene as viewed from a single reference view may be sparsely represented in an entire disocclusion image coextensive with the entire texture or depth image. As used herein, "coextensive" means that both images comprise the same number (or comparable numbers) of pixels or pixel positions.

In some operational scenarios, disocclusion data portions corresponding to an entire (e.g., up to 360 degree, overall, etc.) texture or depth image of a global scene as viewed from one or more reference views may be collectively represented in an entire disocclusion image that may or may not be coextensive with the entire texture or depth image. Pixels represented in the disocclusion data portions may be packed or moved (along with corresponding index or offset information to determine their correct locations in the global scene) into a disocclusion atlas—as illustrated in FIG. 2D—that combines multiple fragments from one or more views into a single image that has a smaller memory footprint or fewer pixels or pixel positions.

The disocclusion atlas may include data indicating a corresponding depth value (e.g., z value, disparity value, parallax value, etc.) as well as a corresponding texture value (e.g., luminance, chrominance. RGB values, YCbCr values, etc.) at or for each pixel in the disocclusion data portions packed in the atlas. Texture and depth information as represented in disocclusion data or atlas can be used to enable or assist image-based rendering operations for non-occluding views adjacent to the reference views in which image details depicted in the disclosure data or atlas are hidden or occluded.

Figure 2D:
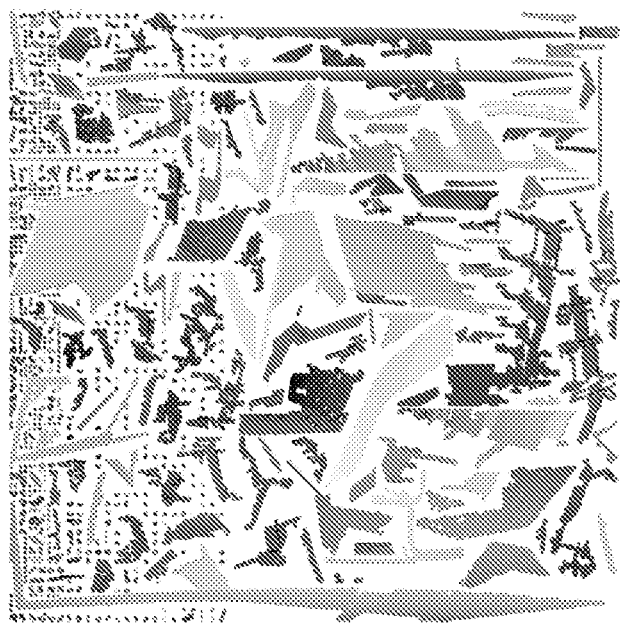

Image metadata as described herein may include pointers or lookup table entries for storing and retrieving disocclusion data portions stored or packed in a disocclusion atlas such as illustrated in FIG. 2D. The pointers or lookup table entries may be used as an addressing scheme to facilitate storing, indexing, updating, searching for, and/or retrieving, in the disocclusion atlas, one or more fragments each representing a collection of contiguous pixels that are occluded in a reference view represented in the disocclusion atlas.

A saliency region as described herein may move in relation to the rest of a global scene depicted in saliency stream based volumetric video. A spatial trajectory or stride of the saliency region may be included or specified in image metadata herein to indicate positions, coordinates, velocities, etc., of the spatial region or object(s) therein. Additionally, optionally or alternatively, geometry information of a saliency region as well as some or all occluded parts or patches of the saliency region as represented in disocclusion data corresponding to the saliency region may be included or specified in image metadata to indicate size(s), shape(s), zoom(s), scaling factor(s), spatial resolution(s), etc., of the saliency region as well as the occluded parts or patches represented in the disocclusion data.

Resolutions may be differentially specified or represented among different video streams and/or disocclusion data. A base video stream may provide a relatively low resolution imagery or depiction of a global scene. In relation to the base video stream, a saliency video stream may provide a relatively high resolution imagery or depiction of a saliency region (e.g., with a ball flying across a relatively stationary overall scene, etc.) in the global scene. Finer pixels (e.g., denser pixels, pixels of relatively high resolution in a spatial unit, etc.) may be used for rendering in the saliency region as compared with non-saliency regions. Occluded pixels as represented in the disocclusion data for the saliency region may be transformed, for example by a recipient device, into the same resolution as that of other pixels in the saliency region.

A spatial resolution of the saliency region may also change over time. For example, the saliency video stream for the saliency region may depict a moving ball towards a viewer. As the ball is depicted as relatively far, the saliency video stream may use a coarser spatial resolution for the saliency region. As the ball is depicted as relatively close, the saliency video stream may use a finer spatial resolution for the saliency region.

Other geometric information such as a size of the saliency region may also change over time. In the previous example, as the ball is depicted as relatively far, the saliency video stream may use a smaller size for the saliency region. As the ball is depicted as relatively close, the saliency video stream may use a larger size for the saliency region.

Image blending operations—including but not limited alpha channel blending, feathering image processing, etc.—may be applied to blend or mix different images from different video streams and/or texture information from disocclusion data to prevent visual artifacts.

Occluded patches or parts each of which comprises a collection of contiguous pixels may tend to split or regroup over time from image to image, from GOP to GOP, from scene to scene, etc., as these occluded patches or parts are being packed into disocclusion atlas(es), thereby possibly making disocclusion data temporally incoherent. As a result, a higher bitrate may need to be used in video streaming to encode disocclusion data or atlas, for example as compared with encoding non-disocclusion data.

Under techniques as described herein, there is no need to encode, stream or decode every occluded patch or part of each entire (e.g., up to 360 degree, overall, etc.) image of a global scene depicted in saliency stream based volumetric video. In some operational scenarios, (e.g., only, etc.) occluded patches or parts in saliency regions tracked by saliency video streams are included in disclosure data or atlas included as a part of the saliency stream based volumetric video delivered from an upstream device to a recipient device.

These occluded patches or parts may be spatially arranged or re-arranged with I-frames and may not be arranged or rearranged with non-I-frames. As a result, disoccluded atlases can be carried in a GOP in which packed fragments form packed image patterns—such as illustrated in FIG. 2D—that are temporally stable and coherent (e.g., with relatively time stable motion vectors or estimation within the GOP in predictive coding, etc.), thereby leading to relatively highly efficient predictive coding and bitrate efficiency (e.g., 50% compression rate, etc.) even with disocclusion data portions.

Additionally, optionally or alternatively, the recipient device receives relatively low quality image(s) of the entire global scene from base video stream(s) in the saliency stream based volumetric video.

The recipient device can (e.g., selectively, based on saliency ranks and/or virtual views associated with the viewer, etc.) decode some or all of the received saliency video streams as well as disocclusion data portions corresponding to the decoded saliency video streams, achieving a relatively highly optimized decoding and rendering process without compromising on the quality of presenting view dependent effects in the virtual views (or synthesized views).

Saliency stream based volumetric video may operate by an upstream stream without receiving live feedback of a viewer's positions or orientations. Additionally, optionally or alternatively, saliency stream based volumetric video may operate by an upstream stream based at least in part on live feedback of a viewer's positions or orientations.

Base and saliency video streams in saliency stream based volumetric video may be encoded with image data of different quality levels, different (spatial) resolutions, different color precisions, different refresh rates, etc. Example multi-resolution multi-view video coding and/or rendering are described in U.S. Provisional Patent Application No. 62/813,527, "MULTI-RESOLUTION MULTI-VIEW VIDEO RENDERING," filed on Mar. 4, 2019, by Haricharan Lakshman et al., the entire contents of which are hereby incorporated by reference as if fully set forth herein.

For example, in response to determining the viewer's foveal view region—to which the viewer's view is directed—in a depicted scene, a set of saliency video streams for a set of reference views adjacent to or near the viewer's position or orientation may be used by the upstream device to deliver image data of the highest quality, highest resolution, highest color precision, highest refresh rate, etc., in a saliency region covering the viewer's foveal view region. In the meantime, a second set of saliency video streams may be used by the upstream device to deliver image data of the second highest quality, highest resolution, highest color precision, highest refresh rate, etc., in a second saliency region immediately adjacent to the viewer's foveal view region. The rest of the viewer's vision field such as peripheral regions or spatial regions opposite to the viewer's vision field may be provided by base video stream(s).

In operational scenarios in which saliency regions tracked by saliency video streams cover the entire image area of a global scene depicted by saliency stream based volumetric video, there is no need to include any base video stream in the saliency stream based volumetric video.

Additionally, optionally or alternatively, in operational scenarios in which saliency regions tracked by saliency video streams do not cover the entire image area of a global scene depicted by saliency stream based volumetric video, one or more base video streams may be included in the saliency stream based volumetric video for at least one reference view, for example closest to a virtual view represented by the viewer's position or orientation.

Additionally, optionally or alternatively, the total number of reference views represented in saliency video streams in saliency stream based volumetric video does not need to be identical to the total number of reference views represented in base video stream(s) in the same saliency stream based volumetric video. For example, saliency stream based volumetric video may comprise four sets of salient video streams supporting four reference views, whereas the saliency stream based volumetric video may comprise only a single base video stream that supports only a single reference view.

In non-saliency regions of a depicted scene, image warping may not be performed. Even if performed, image warping may be performed based on best effort rather than rigorously performed to achieve the highest possible quality for view specific imagery corresponding to a virtual view not coinciding with any reference view represented (e.g., natively, etc.) in the saliency stream based volumetric video. For example, peripheral imagery derived from a base video stream may be rendered with no or little image warping.

Multiple levels of disocclusion data may be used in connection with saliency stream based volumetric video to perform hole filling operations while images of reference view(s) are warped and/or synthesized from the reference view(s) to a virtual view (or a synthesized view). For example, in response to determining the viewer's foveal view region—to which the viewer's view is directed—in a depicted scene, a disocclusion data portion may be delivered as an image metadata portion, in a separate file (e.g., a small metadata file, etc.), as a part of a corresponding salient video stream, etc., by the upstream device to the recipient device. The disocclusion data portion may be used in image warping, synthesizing and/or hole filling operations that warp a decoded image of a saliency region—covering the viewer's foveal view region—tracked by the salient video stream from a reference view to a virtual view (or a synthesized view). In the meantime, a second disocclusion data portion may be delivered as image metadata, in a separate file, as a part of a corresponding second salient video stream, etc., by the upstream device to the recipient device. The second disocclusion data portion may be used in image warping, synthesizing and/or hole filling operations that warp a second decoded image of a second saliency region—immediately adjacent to the viewer's foveal view region—tracked by the salient video stream from the reference view to the virtual view (or synthesized view).

In some operational scenarios, in the rest of the viewer's vision field such as peripheral regions or spatial regions opposite to the viewer's vision field, image warping and/or synthesizing operations can be performed without hole filling operations. In these operational scenarios, no disocclusion data is needed to be generated, delivered or used in image warping and/or synthesizing operations for these spatial regions.

In some operational scenarios, some or all image warping, synthesizing and/or hole filling operations may not be performed in the rest of the viewer's vision field such as peripheral regions or spatial regions opposite to the viewer's vision field. For example, imagery from a base video stream of a reference view closest to a virtual view represented by the viewer's position or orientation may be used for rendering to the viewer in these spatial regions directly without performing some or all image warping, synthesizing and/or hole filling operations.

Disocclusion data may be derived by an upstream device as described herein in a variety of different ways. In an example, the upstream device may receive disocclusion data from an external video data source along with reference texture and/or depth videos of a plurality of different reference views. In another example, the upstream device may deduce texture and/or depth of image details occluded in specific images from images that follow or precede the specific images or other image details that are not occluded in the specific images.

Machine learning (ML) operations may be used by an upstream device or a recipient device to generate disocclusion data. For example, texture and/or depth data may be estimated or predicted with trained ML models that have been trained by occluded or disoccluded image details in a population of training videos.

Example hole filling operations are described in U.S. Provisional Patent Application No. 62/811,956, "HOLE FILLING FOR DEPTH IMAGE BASED RENDERING," filed on Apr. 1, 2019, by Wenhui Jia et al., the entire contents of which are hereby incorporated by reference as if fully set forth herein.

In some operational scenarios, a recipient device can generate disocclusion data, perform hole filling operations without disocclusion data, and/or can perform image warping and/or synthesizing operations without using disocclusion data received with image data. In these operational scenarios, an upstream device can avoid sending disocclusion data while streaming saliency stream based volumetric video (e.g., without including any disocclusion data for some or all base and saliency video streams therein, etc.) to the recipient device. Example image warping and/or synthesizing operations are described in the previously mentioned U.S. Provisional Patent Application No. 62/518,187.

On a high level, a saliency stream representation of volumetric video represents a marriage or combination between object based representations and image based representations. For the most salient objects (or the most salient regions), the saliency stream representation works almost like an object based representation. For less salient parts of an overall scene, the saliency stream representation decays to an image based representation, which ensures that complexity does not explode with an increasing number of objects that may be present in the overall scene. Thus, the saliency stream representation retains benefits of both the object-based representation and the image-based representation.

This approach works particularly well when salient objects or regions in the volumetric video are sparse, for example in an AR application in which a relatively small number of salient objects or regions are superimposed with other visual information in an overall scene. As each saliency object or region can have its own saliency video stream, a corresponding base video stream may be used to capture image information that is mostly black with a relatively low requirement for bitrates. As a result, saliency stream based volumetric video as described herein can have powerful applications for AR related volumetric videos.

Some or all base video image data, saliency video image data, image metadata, disocclusion data (which may be coded as a video stream or as a part of image metadata), etc., may be coded in video streams and/or data containers therein using a video stream format and/or a video coding syntax in connection with DivX, MPEG-I, HEVC/H.265, a standard or specification implemented with home theater PC (HTPC), and so forth.

5. Example Video Streaming Server and Client

Figure 3B:
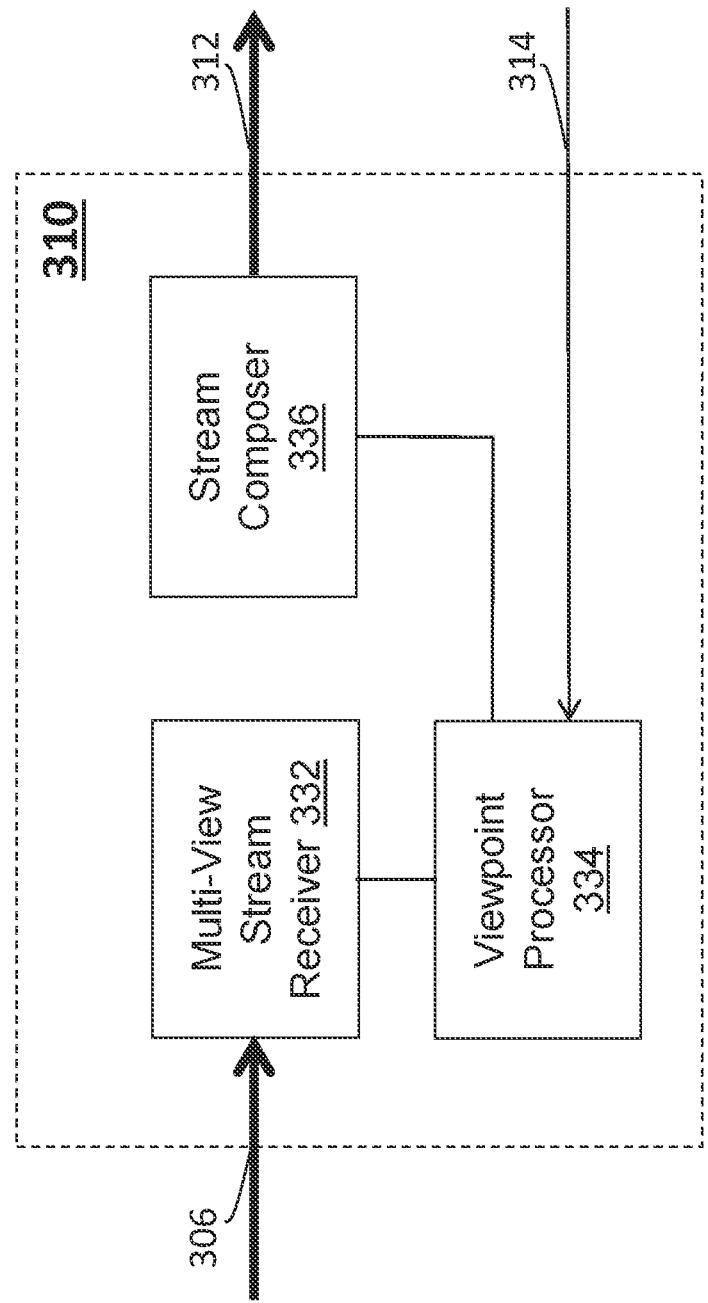

FIG. 3B illustrates an example upstream device such as a video streaming server 310 that comprises a multi-view stream receiver 332, a viewpoint processor 334, a stream composer 336, etc. Some or all of the components of the video streaming server (310) may be implemented by one or more devices, modules, units, etc., in software, hardware, a combination of software and hardware, etc.

The multi-view stream receiver (332) comprises software, hardware, a combination of software and hardware, etc., configured to receive reference texture and/or depth videos (306) for a plurality of reference views directly or indirectly from an external video source.

The viewpoint processor (334) comprises software, hardware, a combination of software and hardware, etc., configured to receive a viewer's viewpoint data from a video client device operated by the viewer in real time or near real time; establish/determine the viewer's positions or orientations for a plurality of time points over a time interval/duration of an AR, VR or volumetric video application. In the video application, display images derived from the reference texture and/or depth videos (306) are to be rendered at the plurality of time points in the viewer's viewport as provided with an image display operating in conjunction with the video client device; etc.

The stream composer (336) comprises software, hardware, a combination of software and hardware, etc., configured to generate a (e.g., real time, etc.) salient stream based representation 312 of volumetric video from the reference texture and/or depth videos (306) based at least in part on one or more of: director's input, user studies, visual saliency algorithms, viewpoint data 314 indicating the viewer's positions or orientations received as a part of input from a recipient device, etc.

The video streaming server (310) may be used to support AR applications, VR applications, 360 degree video applications, volumetric video applications, real time video applications, near-real-time video applications, non-real-time omnidirectional video applications, automobile entertainment, helmet mounted display applications, heads up display applications, games, 2D display applications, 3D display applications, multi-view display applications, etc.

Figure 3C:
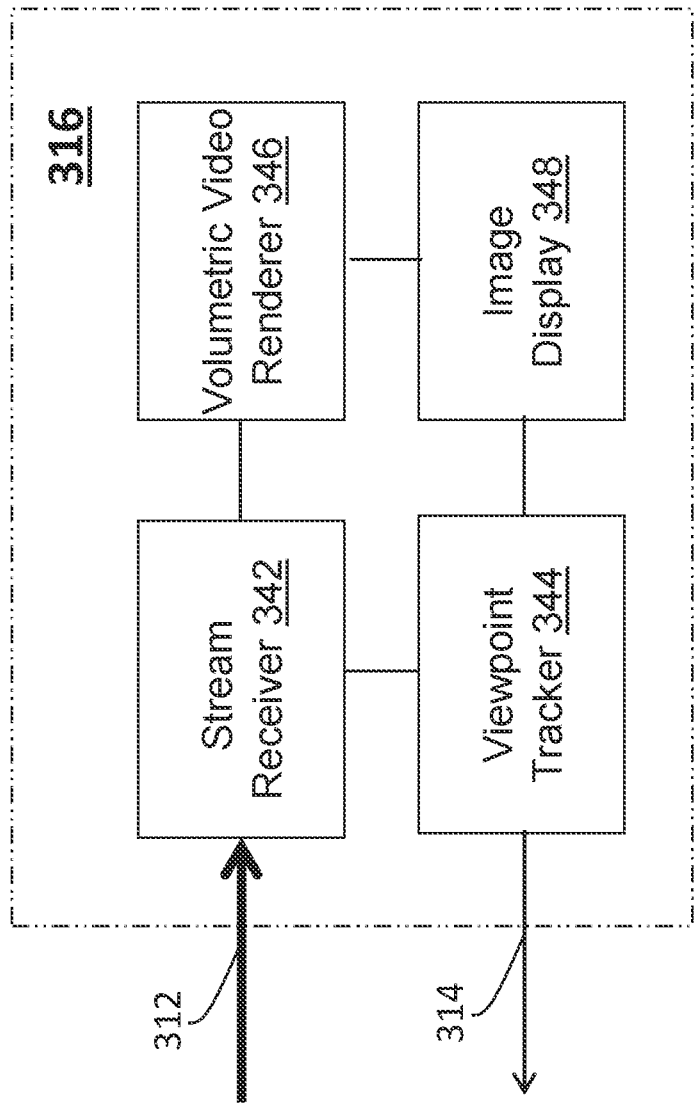

FIG. 3C illustrates an example recipient device such as a video client device 316 that comprises a real time stream receiver 342, a viewpoint tracker 344, a volumetric video renderer 346, image display 348, etc. Some or all of the components of the video client device (316) may be implemented by one or more devices, modules, units, etc., in software, hardware, a combination of software and hardware, etc.

The viewpoint tracker (344) comprises software, hardware, a combination of software and hardware, etc., configured to operate with one or more viewer position/orientation tracking sensors (e.g., motion sensors, position sensors, eye trackers, etc.) to collect real time or near real time viewpoint data 314 in connection with the viewer; send the viewpoint data (314) or the viewer's positions/orientations determined from the viewpoint data to the video streaming server (310); etc. The viewpoint data (314) may be sampled or measured at a relatively fine time scale (e.g., every millisecond, every five milliseconds, etc.). The viewpoint data can be used to establish/determine the viewer's positions or orientations at a given time resolution (e.g., every millisecond, every five milliseconds, etc.).

The real time stream receiver (342) comprises software, hardware, a combination of software and hardware, etc., configured to receive and decode the real time saliency stream based volumetric video (312).

The volumetric video renderer (346) comprises software, hardware, a combination of software and hardware, etc., configured to perform image warping, image warping, blending (e.g., blending multiple warped images from multiple camera sources, etc.), image composition, hole filling, etc., on image data decoded from the real time saliency stream based volumetric video (312) to generate view specific images corresponding to the viewer's predicted or measured positions or orientations; output the view specific images to the image display (348) for rendering; etc.

As used herein, video content in a video stream as described herein may include, but are not necessarily limited to, any of: audiovisual programs, movies, video programs. TV broadcasts, computer games, augmented reality (AR) content, virtual reality (VR) content, automobile entertainment content, etc. Example video decoders may include, but are not necessarily limited to, any of: display devices, a computing device with a near-eye display, a head-mounted display (HMD), a mobile device, a wearable display device, a set-top box with a display such as television, a video monitor, etc.

As used herein, a "video streaming server" may refer to one or more upstream devices that prepare and stream video content to one or more video streaming clients such as video decoders in order to render at least a portion of the video content on one or more displays. The displays on which the video content is rendered may be part of the one or more video streaming clients, or may be operating in conjunction with the one or more video streaming clients.

Example video streaming servers may include, but are not necessarily limited to, any of: cloud-based video streaming servers located remotely from video streaming client(s), local video streaming servers connected with video streaming client(s) over local wired or wireless networks, VR devices, AR devices, automobile entertainment devices, digital media devices, digital media receivers, set-top boxes, gaming machines (e.g., an Xbox), general purpose personal computers, tablets, dedicated digital media receivers such as the Apple TV or the Roku box, etc.

7. Example Process Flows

FIG. 4A illustrates an example process flow according to an example embodiment of the present invention. In some example embodiments, one or more computing devices or components may perform this process flow. In block 402, an upstream device identifies a set of one or more saliency regions in a global scene depicted by the volumetric video.

In block 404, the upstream device generates a set of one or more saliency video streams that track the set of one or more saliency regions identified in the global scene. Each saliency video stream in the set of one or more saliency video streams tracks a respective saliency region in the set of one or more saliency regions.

In block 406, the upstream device generates a saliency stream based representation of the volumetric video. The saliency stream based representation includes the set of one or more saliency video streams.

In block 408, the upstream device transmits the saliency stream based representation of the volumetric video to a video streaming client.

In an embodiment, the saliency stream based representation includes at least one base video stream depicting the global scene including image areas other than the set of one or more saliency regions; the at least one base video stream enables the video streaming client to render imagery outside the set of one or more spatial regions depicted by the set of one or more saliency video streams.

In an embodiment, the saliency stream based representation includes a disocclusion data associated with a saliency video stream in the set of one or more saliency video streams; the disocclusion data includes texture and depth information for image details occluded in a reference view depicted by the saliency video stream; the image details occluded in the reference view become disoccluded in one or more other views adjacent to the reference view.

In an embodiment, the set of one or more saliency video streams includes a first saliency video stream assigned with a first saliency rank and a second saliency video stream assigned with a second saliency rank lower than the first saliency rank; the second video stream is removed from the set of one or more saliency video streams to be transmitted to the video streaming client at a later time, in response to determining that an available data rate has been reduced.

In an embodiment, the set of one or more saliency video streams includes a first saliency video stream assigned with a first saliency rank and a second saliency video stream assigned with a second saliency rank lower than the first saliency rank; the second video stream is removed from the set of one or more saliency video streams to be transmitted to the video streaming client at a later time, in response to determining, based on real time viewpoint data, that a virtual view represented by the viewer's viewpoint is directed to a different spatial region away from a saliency region tracked by the second video stream.

In an embodiment, image metadata is transmitted with the set of one or more saliency video streams to enable the video streaming client to render images derived from the set of saliency video streams and any accompanying disocclusion.

In an embodiment, viewpoint data of a viewer collected in real time while the viewer is viewing imagery generated from the volumetric video is received from the video streaming client; the viewpoint data is used to select the set of one or more saliency streams in one or more reference views closest to a virtual view represented by the viewer's viewpoint as indicated in the viewpoint data.

In an embodiment, an input version of the volumetric video is received and used to derive the saliency stream representation of the volumetric video; the input version of the volumetric video includes a group of pictures (GOP) comprising a plurality of full resolution images depicting the global scene; at least one saliency video stream in the set of one or more saliency video streams is initialized at a starting time point of the GOP.

FIG. 4B illustrates an example process flow according to an example embodiment of the present invention. In some example embodiments, one or more computing devices or components may perform this process flow. In block 452, a recipient device receives a saliency stream based representation of the volumetric video from a video streaming server. The saliency stream based representation includes a set of one or more saliency video streams. The set of one or more saliency video streams track a set of one or more saliency regions identified in a global scene that is depicted in the volumetric video.

In block 454, the recipient device derives a set of one or more saliency region images from the set of one or more saliency video streams. Each saliency region image in the set of one or more saliency region images depicts a respective saliency region in the set of one or more saliency regions tracked by the set of one or more saliency video streams.

In block 456, the recipient device causes one or more reconstructed images to be generated at least in part from the saliency region image data. The one or more reconstructed images depict the global scene. The one or more reconstructed images are rendered on an image display to a viewer.

In an embodiment, the set of one or more saliency region images corresponds to a set of one or more reference views; viewpoint data of a viewer collected in real time while the viewer is viewing imagery derived from the saliency stream based representation of the volumetric video; the viewpoint data is used to determine a virtual view represented by the viewer's viewpoint; at least one saliency region image in the set of one or more saliency region images is transformed from the set of one or more reference views to the virtual view.

In an embodiment, at least one reconstructed image in the one or more reconstructed images comprises pixel data derived from disocclusion data received with the set of one or more saliency stream.

In an embodiment, the saliency stream based representation includes at least one base video stream depicting the global scene including image areas other than the set of one or more saliency regions; the at least one base video stream is used to render imagery outside the set of one or more spatial regions depicted by the set of one or more saliency video streams.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

8. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
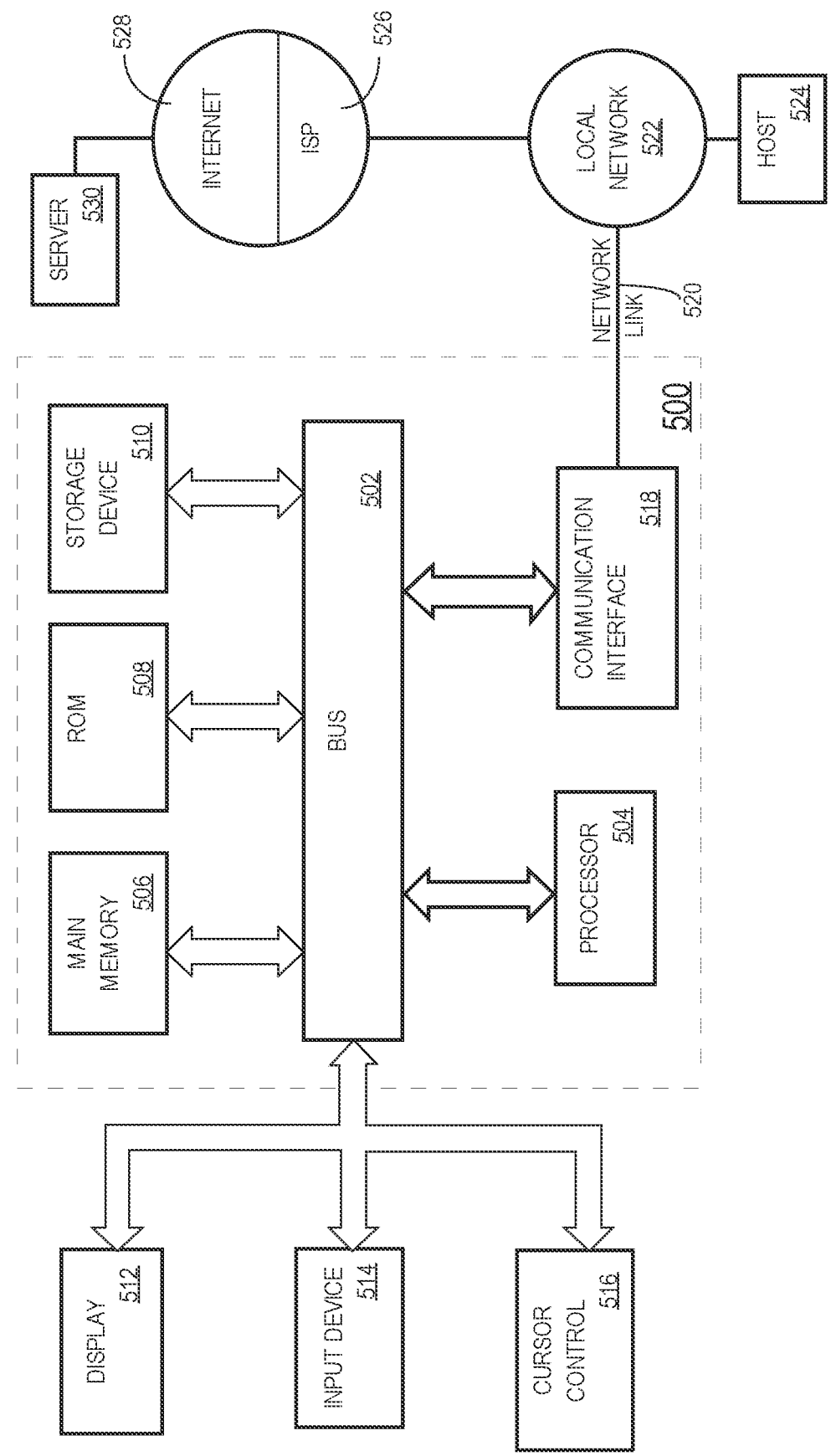
FIG. 5 illustrates an example hardware platform on which a computer or a computing device as described herein may be implemented.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, solid state RAM, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

9. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following enumerated example embodiments (EEEs):

EEE 1. A method for streaming volumetric video, comprising:
identifying a set of one or more saliency regions in a global scene depicted by the volumetric video;
generating a set of one or more saliency video streams that track the set of one or more saliency regions identified in the global scene, wherein each saliency video stream in the set of one or more saliency video streams tracks a respective saliency region in the set of one or more saliency regions:
generating a saliency stream based representation of the volumetric video, wherein the saliency stream based representation includes the set of one or more saliency video streams;
transmitting the saliency stream based representation of the volumetric video to a video streaming client.

EEE 2. The method of EEE 1, wherein the saliency stream based representation includes at least one base video stream depicting the global scene including image areas other than the set of one or more saliency regions, wherein the at least one base video stream enables the video streaming client to render imagery outside the set of one or more spatial regions depicted by the set of one or more saliency video streams.

EEE 3. The method of EEE 1 or 2, wherein the saliency stream based representation includes a disocclusion data associated with a saliency video stream in the set of one or more saliency video streams, wherein the disocclusion data includes texture and depth information for image details occluded in a reference view depicted by the saliency video stream, wherein the image details occluded in the reference view become disoccluded in one or more other views adjacent to the reference view.

EEE 4. The method of any of EEEs 1-3, wherein the set of one or more saliency video streams includes a first saliency video stream assigned with a first saliency rank and a second saliency video stream assigned with a second saliency rank lower than the first saliency rank, wherein the second video stream is removed from the set of one or more saliency video streams to be transmitted to the video streaming client at a later time, in response to determining that an available data rate has been reduced.

EEE 5. The method of any of EEEs 1-4, wherein the set of one or more saliency video streams includes a first saliency video stream assigned with a first saliency rank and a second saliency video stream assigned with a second saliency rank lower than the first saliency rank, wherein the second video stream is removed from the set of one or more saliency video streams to be transmitted to the video streaming client at a later time, in response to determining, based on real time viewpoint data, that a virtual view represented by the viewer's viewpoint is directed to a different spatial region away from a saliency region tracked by the second video stream.

EEE 6. The method of any of EEEs 1-5, wherein image metadata is transmitted with the set of one or more saliency video streams to enable the video streaming client to render images derived from the set of saliency video streams and any accompanying disocclusion.

EEE 7. The method of any of EEEs 1-6, wherein viewpoint data of a viewer collected in real time while the viewer is viewing imagery generated from the volumetric video is received from the video streaming client, wherein the viewpoint data is used to select the set of one or more saliency streams in one or more reference views closest to a virtual view represented by the viewer's viewpoint as indicated in the viewpoint data.

EEE 8. The method of any of EEEs 1-7, wherein an input version of the volumetric video is received and used to derive the saliency stream representation of the volumetric video, wherein the input version of the volumetric video includes a group of pictures (GOP) comprising a plurality of full resolution images depicting the global scene, wherein at least one saliency video stream in the set of one or more saliency video streams is initialized at a starting time point of the GOP.

EEE 9. A method for rendering volumetric video, comprising:
receiving a saliency stream based representation of the volumetric video from a video streaming server, wherein the saliency stream based representation includes a set of one or more saliency video streams, wherein the set of one or more saliency video streams track a set of one or more saliency regions identified in a global scene that is depicted in the volumetric video;
deriving a set of one or more saliency region images from the set of one or more saliency video streams, wherein each saliency region image in the set of one or more saliency region images depicts a respective saliency region in the set of one or more saliency regions tracked by the set of one or more saliency video streams;
causing one or more reconstructed images to be generated at least in part from the saliency region image data, wherein the one or more reconstructed images depict the global scene, wherein the one or more reconstructed images are rendered on an image display to a viewer.

EEE 10. The method of EEE 9, wherein the set of one or more saliency region images corresponds to a set of one or more reference views, wherein viewpoint data of a viewer collected in real time while the viewer is viewing imagery derived from the saliency stream based representation of the volumetric video, wherein the viewpoint data is used to determine a virtual view represented by the viewer's viewpoint, wherein at least one saliency region image in the set of one or more saliency region images is transformed from the set of one or more reference views to the virtual view.

EEE 11. The method of EEE 9 or 10, wherein at least one reconstructed image in the one or more reconstructed images comprises pixel data derived from disocclusion data received with the set of one or more saliency stream.

EEE 12. The method of any of EEEs 9-11, wherein the saliency stream based representation includes at least one base video stream depicting the global scene including image areas other than the set of one or more saliency regions, wherein the at least one base video stream is used to render imagery outside the set of one or more spatial regions depicted by the set of one or more saliency video streams.

EEE 13. An apparatus performing any of the methods as recited in EEEs 1-12.

EEE 14. A non-transitory computer readable storage medium, storing software instructions, which when executed by one or more processors cause performance of the method recited in any of EEEs 1-12.

EEE 15. A computing device comprising one or more processors and one or more storage media, storing a set of instructions, which when executed by one or more processors cause performance of the method recited in any of EEEs 1-12.

The invention claimed is:

1. A method for streaming volumetric video, comprising:
identifying a set of one or more saliency regions in a global scene depicted by the volumetric video;
generating a set of one or more saliency video streams that track the set of one or more saliency regions identified in the global scene, wherein each saliency video stream in the set of one or more saliency video streams tracks a respective saliency region in the set of one or more saliency regions;
generating a saliency stream based representation of the volumetric video, wherein the saliency stream based representation includes the set of one or more saliency video streams;
transmitting the saliency stream based representation of the volumetric video to a video streaming client,
wherein the set of one or more saliency video streams includes a first saliency video stream assigned with a first saliency rank and a second saliency video stream assigned with a second saliency rank lower than the first saliency rank, wherein the second saliency video stream is removed from the set of one or more saliency video streams to be transmitted to the video streaming client at a later time, in response to determining that an available data rate has been reduced.

2. The method of claim 1, wherein the first saliency rank and/or the second saliency rank is ranked by one or more of: input from a content creator or a director, viewer statistical information gathering and analyses, and visual saliency algorithms based at least in part on computer vision techniques.

3. The method of claim 1, wherein the saliency stream based representation includes at least one base video stream depicting the global scene including image areas other than the set of one or more saliency regions, wherein the at least one base video stream enables the video streaming client to render imagery outside the set of one or more saliency regions depicted by the set of one or more saliency video streams.

4. The method of claim 1, wherein the saliency stream based representation includes a disocclusion data associated with a saliency video stream in the set of one or more saliency video streams, wherein the disocclusion data includes texture and depth information for image details occluded in a reference view depicted by the saliency video stream, wherein the image details occluded in the reference view become disoccluded in one or more other views adjacent to the reference view.

5. The method of claim 1, wherein the set of one or more saliency video streams includes the first saliency video stream assigned with a first saliency rank and the second saliency video stream assigned with a second saliency rank lower than the first saliency rank, wherein the second saliency video stream is removed from the set of one or more saliency video streams to be transmitted to the video streaming client at a later time, in response to determining, based on real time viewpoint data, that a virtual view represented by a viewer's viewpoint is directed to a different spatial region away from a saliency region tracked by the second saliency video stream.

6. The method of claim 1, wherein image metadata is transmitted with the set of one or more saliency video streams to enable the video streaming client to render images derived from the set of saliency video streams and any accompanying disocclusion.

7. The method of claim 1, wherein viewpoint data of a viewer collected in real time while the viewer is viewing imagery generated from the volumetric video is received from the video streaming client, wherein the viewpoint data is used to select the set of one or more saliency streams in one or more reference views closest to a virtual view represented by a viewpoint, of the viewer, as indicated in the viewpoint data.

8. The method of claim 1, wherein an input version of the volumetric video is received and used to derive the saliency stream based representation of the volumetric video, wherein the input version of the volumetric video includes a group of pictures (GOP) comprising a plurality of full resolution images depicting the global scene, wherein at least one saliency video stream in the set of one or more saliency video streams is initialized at a starting time point of the GOP.

9. An apparatus comprising a non-transitory computer readable storage medium, storing software instructions, which when executed by one or more processors cause performance of the method recited in claim 1.

10. A non-transitory computer readable storage medium, storing software instructions, which when executed by one or more processors cause performance of the method recited in claim 1.

11. A computing device comprising one or more processors and one or more storage media, storing a set of instructions, which when executed by one or more processors cause performance of the method recited in claim 1.

* * * * *